US007590895B2

(12) United States Patent
Fujibayashi

(10) Patent No.: US 7,590,895 B2
(45) Date of Patent: Sep. 15, 2009

(54) HEARTBEAT APPARATUS VIA REMOTE MIRRORING LINK ON MULTI-SITE AND METHOD OF USING SAME

(75) Inventor: Akira Fujibayashi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 145 days.

(21) Appl. No.: 11/976,533

(22) Filed: Oct. 25, 2007

(65) Prior Publication Data

US 2008/0072105 A1 Mar. 20, 2008

Related U.S. Application Data

(63) Continuation of application No. 11/542,247, filed on Oct. 4, 2006, now Pat. No. 7,308,615, which is a continuation of application No. 10/802,003, filed on Mar. 17, 2004, now Pat. No. 7,137,042.

(51) Int. Cl.
*G06F 11/00* (2006.01)

(52) U.S. Cl. .............................. 714/47; 714/6; 709/224

(58) Field of Classification Search ..................... 714/6, 714/47, 10; 709/224; 710/16
See application file for complete search history.

(56) References Cited

U.S. PATENT DOCUMENTS

| | | | |
|---|---|---|---|
| 5,459,857 | A | 10/1995 | Ludlam et al. |
| 5,544,347 | A | 8/1996 | Yanai et al. |
| 5,561,825 | A | 10/1996 | Yamagami et al. |
| 5,592,630 | A | 1/1997 | Yamagami et al. |
| 5,699,510 | A | 12/1997 | Petersen et al. |
| 5,928,367 | A | 7/1999 | Nelson et al. |
| 5,933,653 | A | 8/1999 | Ofek |
| 6,035,415 | A | 3/2000 | Fleming |
| 6,044,444 | A | 3/2000 | Ofek |
| 6,052,797 | A | 4/2000 | Ofek et al. |
| 6,105,078 | A | 8/2000 | Crockett et al. |

(Continued)

OTHER PUBLICATIONS

U.S. Appl. No. 10/273,048, filed Oct. 26, 2002, Fujibayashi et al.

(Continued)

*Primary Examiner*—Robert Beausoliel
*Assistant Examiner*—Philip Guyton
(74) *Attorney, Agent, or Firm*—Stites & Harbison PLLC; Juan Carlos A. Marquez, Esq.

(57) ABSTRACT

The present invention is directed to a heartbeat apparatus via a remote mirroring link for a multi-site and a method for using the heartbeat apparatus. Information is registered in a configuration table, wherein the configuration table stores host ID information and volume ID information. The configuration table is configured, access requests from a host are verified, host activity is recorded, and additional records are created in the configuration table when a match is found between the access records and the registered information. In a multi-site having two, three or more sites in a multi-hoop configuration, a failover process with remote mirroring pairs is performed by configuring a correlation between a remote mirroring pair group, an activity monitor function and an alert function, wherein the alert function is performed by a host sending status information regarding activity monitoring in a storage system and retrieving the notification information via a plurality of data links, and creating a status manage table using the notification information.

14 Claims, 28 Drawing Sheets

U.S. PATENT DOCUMENTS

| | | | | |
|---|---|---|---|---|
| 6,163,855 | A | 12/2000 | Shrivastava et al. | |
| 6,363,497 | B1 | 3/2002 | Chrabaszcz | |
| 6,467,034 | B1 | 10/2002 | Yanaka | |
| 6,587,970 | B1 | 7/2003 | Wang et al. | |
| 6,643,795 | B1 | 11/2003 | Sicola et al. | |
| 6,671,705 | B1 | 12/2003 | Duprey et al. | |
| 6,701,449 | B1 | 3/2004 | Davis et al. | |
| 6,732,243 | B2 | 5/2004 | Busser et al. | |
| 6,834,326 | B1 | 12/2004 | Wang et al. | |
| 6,898,730 | B1 | 5/2005 | Hanan | |
| 7,058,850 | B2 | 6/2006 | Cochran | |
| 7,065,670 | B2 | 6/2006 | Gahan et al. | |
| 7,137,042 | B2 | 11/2006 | Fujibayashi | |
| 7,380,078 | B2 * | 5/2008 | Ikegaya et al. | 711/156 |
| 7,475,134 | B2 * | 1/2009 | Cook et al. | 709/224 |
| 2002/0095489 | A1 | 7/2002 | Yamagami | |
| 2004/0078644 | A1 | 4/2004 | Fujibayashi et al. | |
| 2004/0153841 | A1 | 8/2004 | Beck | |
| 2005/0076154 | A1 | 4/2005 | Chambliss et al. | |
| 2005/0080895 | A1 | 4/2005 | Cook et al. | |
| 2005/0114467 | A1 | 5/2005 | Ikegaya et al. | |
| 2005/0234988 | A1 | 10/2005 | Messick | |

OTHER PUBLICATIONS

"Hitachi Freedom Storage™, Software Solutions Guide," Hitachi Data Systems, 2003, pp. iv-x, 1-75.

"Building Highly Available Database Servers Using Oracle Real Application Clusters," Oracle White Paper, May 2002, pp. 1-17.

"Network Disc Mirror," http://www.twincom.com/netdisc.html, pp. 1-4.

* cited by examiner

| CONF ID 502 | 503 | VOLUME ID 504 | HOST 505 | INTERVAL 506 | THRESHOLD 507 | ACTIVITY 508 | | | | STATUS 513 | STORAGE 514 |
|---|---|---|---|---|---|---|---|---|---|---|---|
| | | | | | | 509 | 510 | 511 | 512 | | |
| 0 | ENABLE | 333 | WWN A | 15 | 45 | 150 US | 1000 | 3000 | 60% | LIVE | 60002 |

HEARTBEAT APPARATUS VIA REMOTE MIRRORING LINK ON MULTI-SITE AND METHOD OF USING SAME

CROSS-REFERENCE TO RELATED APPLICATION

This application is a Continuation application of U.S. application Ser. No. 11/542,247 filed Oct. 4, 2006, now U.S. Pat. No. 7,308,615 which is a continuation of U.S. application Ser. No. 10/802,003 filed Mar. 17, 2004 now U.S. Pat. No. 7,137,042. Priority is claimed based on U.S. application Ser. No. 11/542,247 filed Oct. 4, 2006, which claims the priority of U.S. application Ser. No. 10/802,003 filed Mar. 17, 2004, all of which is incorporated by reference.

BACKGROUND OF THE INVENTION

1. Field of the Invention

The present invention relates to cluster computing systems. More particularly, the present invention relates to systems and methods for providing heartbeat check using remote mirroring technologies.

2. Related Art

We are witnessing today an increased demand for online services. One solution, recently implemented and already widely spread that allows for increasing the availability of online services is clustering multi-site systems. However, even within a multi-site cluster the heartbeat signals and their send/receive methods are carried out on TCP/IP links. This feature of the multi-site cluster proves to be unstable and implicitly renders unstable the overall availability of service and the quality of online services provided by the multi-site systems.

In case of network failure, the times between the network failure and service recovery must be as short as possible. In practice, the time necessary to confirm the failure and to start the failover process has proven to be long. One reason is the lack of stability in the network links, which, as mentioned above, are still provided by a clustered network over TCP/IP.

In case of disaster, network administrators need robust mechanisms for disaster recovery, especially for the recovery of multi-site network environments and for instances when volume migration is needed between the sites. Big users, such as banking, brokerage, and insurance companies, that have many data centers scattered worldwide, have to manage multi-sites and to check operability of service at each of those sites, often during short periods of time. They need both network robustness and fast failover in case of network failure.

What are needed are robust ways of transmitting heartbeat signals and performing the send/receive methods within the cluster multi-site system. Also, what are needed are robust heartbeat link methods through robust remote mirroring links, such as ESCON, FibreChannel, telecom lines or a combination thereof.

BRIEF DESCRIPTION OF THE INVENTION

One embodiment of the present invention addresses these needs by providing a heartbeat apparatus via a remote mirroring link for a multi-site and a method for using the heartbeat apparatus. The method for performing heartbeat check on multi-sites comprises registering information in a configuration table, wherein said configuration table stores host ID information and volume ID information, configuring the configuration table, verifying access requests from a host, recording host activity, wherein a match is found between said access records and said registered information, and creating additional records in said configuration table.

Another embodiment of the present invention addresses these needs by providing a heartbeat apparatus via a remote mirroring link wherein the multi-site has two, three or more sites in a multi-hoop configuration and a method of using the heartbeat apparatus. A method for performing a failover process with remote mirroring pairs, comprises configuring a correlation between a remote mirroring pair group, an activity monitor function and an alert function, wherein the alert function is performed by a host sending status information regarding the activity monitor function in a storage system and retrieving the notification information via a plurality of data links, and creating a status manage table using the notification information.

Yet another embodiment of the present invention addresses these needs by providing methods for system activity and alert monitor.

The present invention provides system administrators and IT managers with a robust heartbeat mechanism for disaster recovery in multi-site network environments. The present invention also provides system administrators and IT managers with a mechanism for remote volume migration in multi-site network environments. Currently big storage users, such as banks, brokerage and insurance companies, have a plurality of data centers incorporated into their network environments. These data centers are scattered world-wide. A large plurality of multi-sites need to be managed and within this plurality, constant hardware and service responsiveness checks need to be performed. The invention provides system administrators with both robustness of service and fast failover in case of emergency.

BRIEF DESCRIPTION OF THE DRAWINGS

The present invention will be described hereinbelow with reference to the accompanying drawings:

FIG. 5 illustrates an example of a configuration table.

DETAILED DESCRIPTION OF THE INVENTION

In the following description for the preferred embodiments, reference is made to the accompanying drawings which form a part thereof, and in which are shown by way of illustration specific embodiments in which the invention might be practiced. It is to be understood that other embodiments may be utilized and structural changes may be made without departing from the scope of the present invention.

Figure 1A:
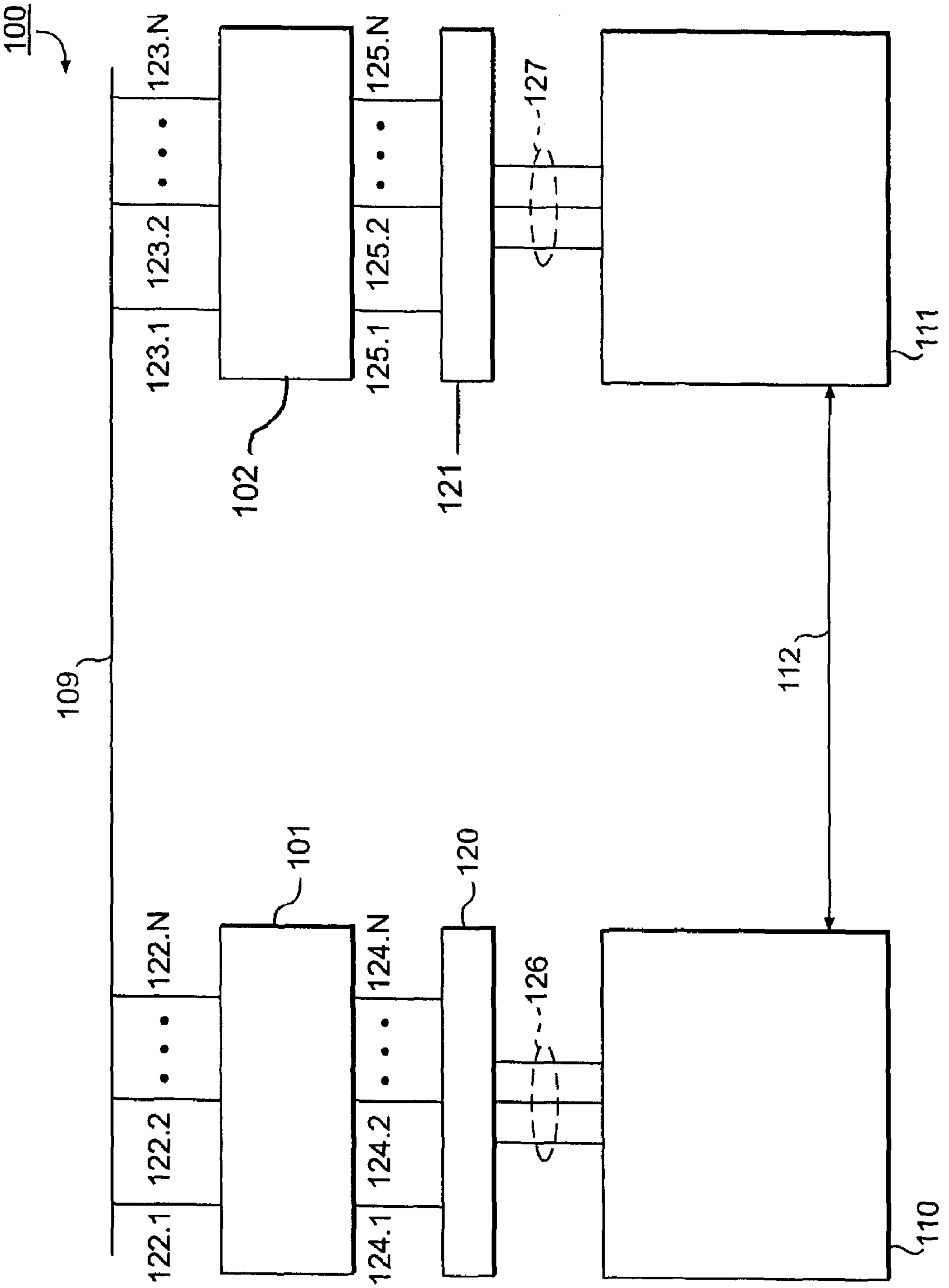
FIG. 1A is a high-level block diagram illustrating a basic configuration of an embodiment of the present invention showing a heartbeat apparatus via remote mirroring link.

FIG. 1A is a high-level block diagram illustrating a basic configuration of an embodiment of the present invention, showing a heartbeat apparatus via a remote mirroring link.

Apparatus 100 comprises a primary host group 101, a secondary host group 102, a primary SAN 120, a secondary SAN 121, storage systems 110 and 111, a remote link 112, a network 109, a plurality of network/primary host data interchange links 122.1 through 122.N, a plurality of network/secondary data secondary host data interchange links 123.1 through 123.N, a plurality of primary host/SAN data interchange links 124.1 through 124.N, a plurality of secondary host/SAN data interchange links 125.1 through 125.N, a plurality of SAN/storage system links 126 and a plurality of SAN/storage system links 127. The plurality of links 122.1 through 122.N, 123.1 through 123.N, 124.1 through 124.N, 125.1 through 125.N, 126 and 127 are, but are not limited to, stable links. In cases when the plurality of links is realized over cables, their failure is unlikely. The configuration of apparatus 100 comprises, two host groups: primary host group 101 and secondary host group 102. Both, primary host group 101 and secondary host group 102, comprise a plurality of hosts. A host can be, but is not limited to, a server or other data processing device or system of similar, comparable or greater processing/computing capability.

Apparatus 100 also embodies a network 109. From network 109, the plurality of network/primary host/SAN data interchange links 122.1 to 122.N connect the network with the primary host group 101. Another plurality of network/second host data/SAN data interchange links 124.1 to 124.N connect the primary host group 101 with the primary SAN 120. Primary SAN 120 is connected with storage system 110 through multiple switch/storage system links 126. In an analogous manner, the secondary host group 102 is connected with network 109 through a plurality of network/secondary host data interchange links 123.1 through 123.N. Secondary host group 102 is connected with SAN 121 through a plurality of secondary host/SAN data interchange links 125.1 through 125.N. SAN 121 is connected with storage system 111 through multiple switch/SAN system links 127. Storage systems 110 and 111 are connected among themselves by a remote logical link 112. Network 109 (that connects the primary host group 101 with the secondary group 102), is either, but not limited to, a LAN network or a WAN network. Through network 109 that provides for the capability of creating a cluster system, a heartbeat signal is transmitted between primary host group 101 and secondary host group 102. More specifically, network 109 allows transmittal of a heartbeat signal between the hosts that are comprised in each primary host group 101 and secondary host group 102. Network 109 also allows for transferring a heartbeat signal from each primary host group 101 and secondary host group 102.

The heartbeat signal performs heartbeat checking. More specifically, heartbeat checking involves checking whether the primary host group or the secondary host group is alive or not. This verification is realized by monitoring if either primary host group 101 or secondary host group 102 are sending a heartbeat message storage. Systems 110 and 111 each comprise two or more disk units. They also comprise elements 120, 121, 122, and a plurality of storage volumes 114 or 115. Storage systems 110 and 111 are connected to each other by one or more remote links 112. Storage systems 110 and 111 communicate with each other through remote links 112. Possible embodiments for the plurality of remote links 122, 124 and 126 include ESCON, Fibre Channels, telecommunications lines, dark fibers or a combination thereof with standard protocols.

Figure 1B:
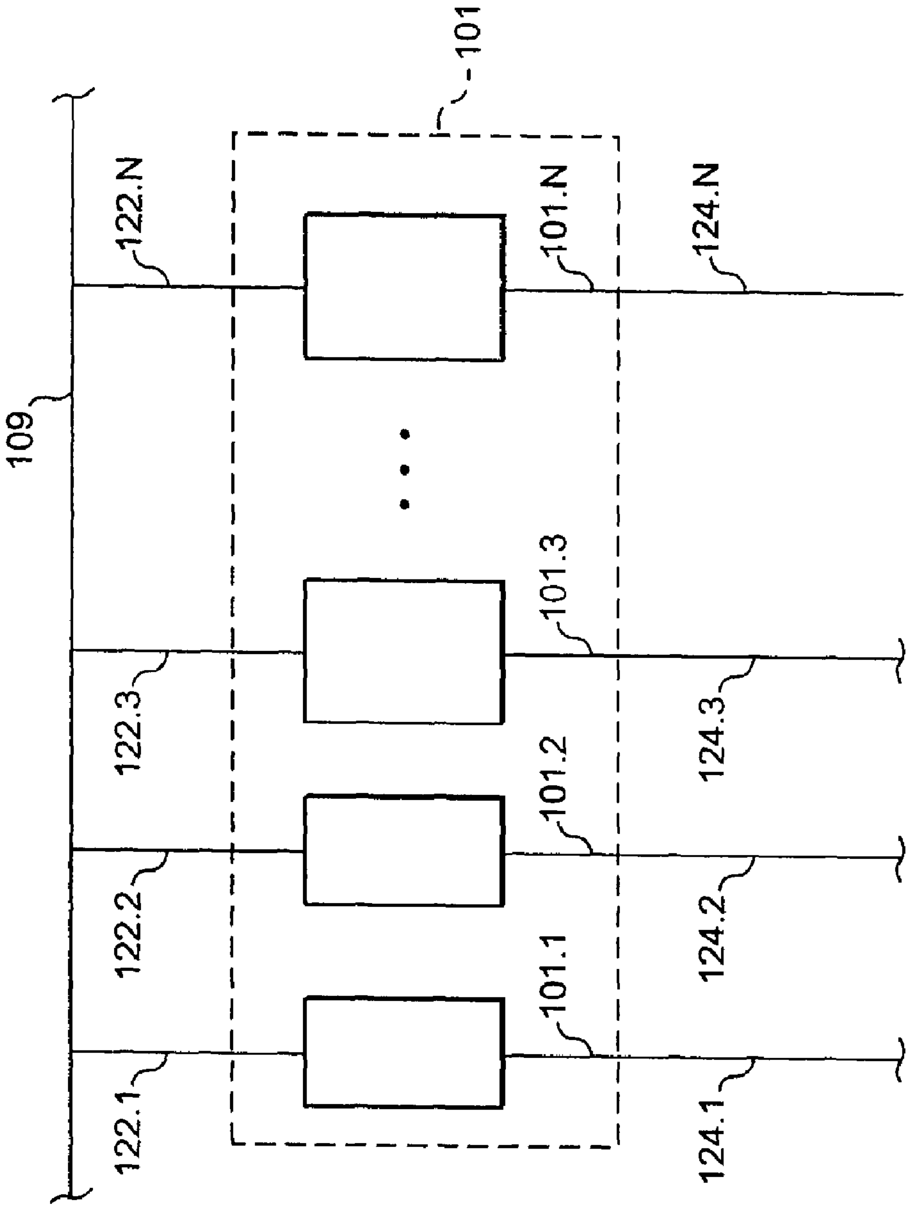
FIG. 1B illustrates a high-level block diagram of a host group and its environment, according to an embodiment of the present invention.

FIG. 1B illustrates a high-level block diagram of a host group and its environment, according to an embodiment of the present invention. More specifically, primary host group 101 is illustrated in FIG. 1B along with the links that provide for its connection to network 109 and with the links that provide connection to SAN 120. Primary host group 101 comprises a plurality of hosts 101.1 through 101.N. Each of these hosts is connected to network 109 through a plurality of links 122.1 to 122.N. More specifically, the plurality of links 122.1 to 122.N realized between the network 109 and host 101 are network/primary host data interchange links. Each host 101 is connected with SAN 120 through a link 124. More specifically, a link 124 may be implemented as a plurality of primary host/SAN data interchange links 124.1 to 124.N. The plurality of hosts comprised by the primary host group 101 communicates via network 109 with at least one other plurality of hosts comprised by the secondary host group 102.

Figure 1C:
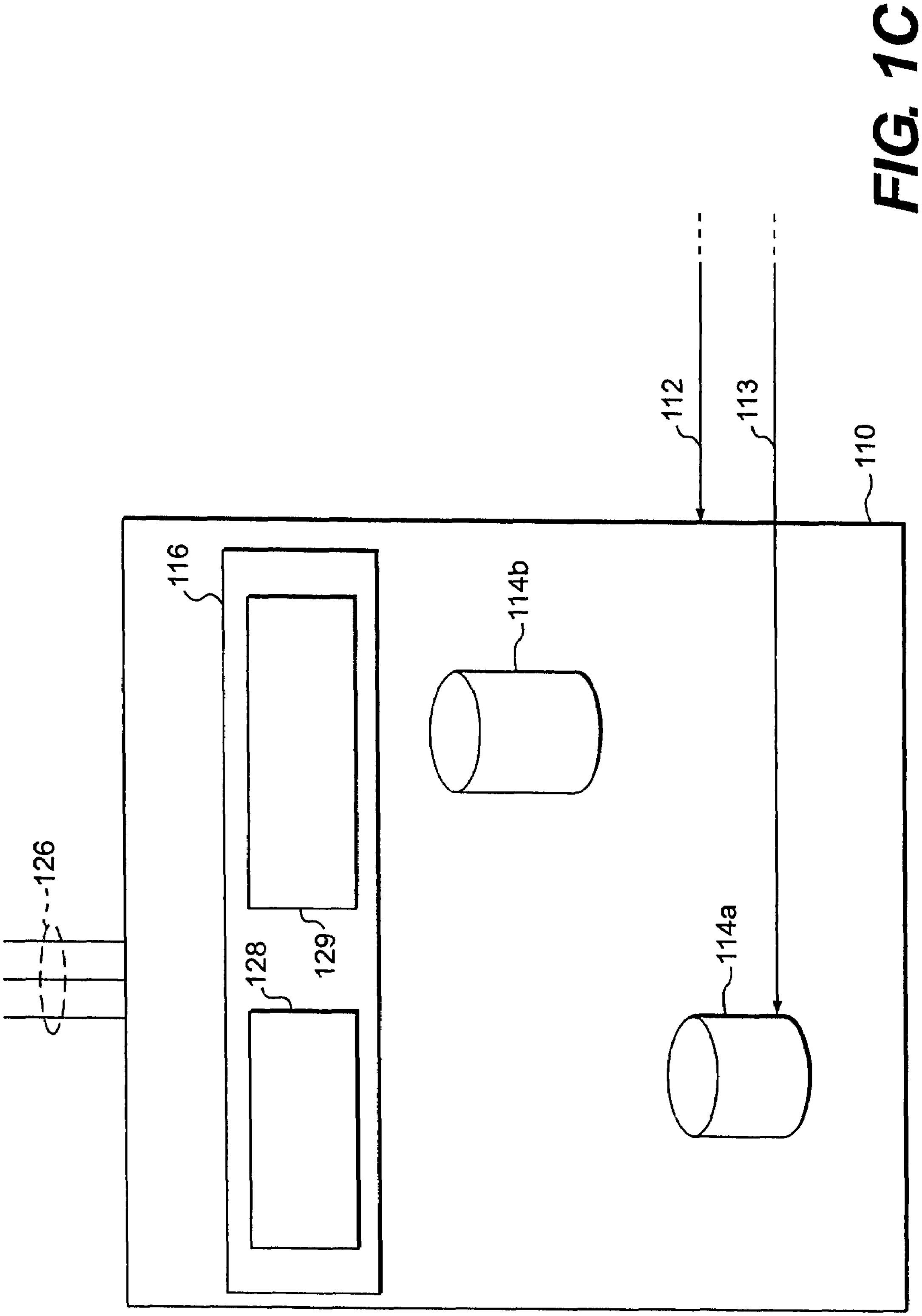
FIG. 1C illustrates a high-level block diagram of a storage system, according to an embodiment of the present invention.

FIG. 1C illustrates a high-level block diagram of a storage system, according to an embodiment of the present invention. More specifically, FIG. 1C illustrates storage system 110 that is connected with SAN 120 through a plurality of SAN/storage system links 126. Storage system 110 incorporates an alert engine 128 and a monitor engine 129. Alert engine 128 and monitor engine 129 are embodied in monitoring activity and the alert function block 116. Block 116 further includes a table 118 for storing registered host ID and information about the I/O activity.

Storage system 110 also comprises a plurality of storage volumes 114. For purposes of illustration only, FIG. 1C shows an example storage system 110 that incorporates at least two storage volumes, 114*a* and 114*b*. Storage systems 110 and 111 illustrated by FIG. 1C are configured based on the same logic as described above in connection with FIG. 1A. Between the plurality of storage volumes 114 of storage system 110 and the plurality of storage volumes 115 of storage system 111, a remote mirror link 113 is established. A plurality of remote mirror links similar to remote mirror link 113 can be established between each storage volume 114*a*-114*n* of storage system 110 and each corresponding storage volume 115*a*-115*n* of storage system 111.

Figure 1D:
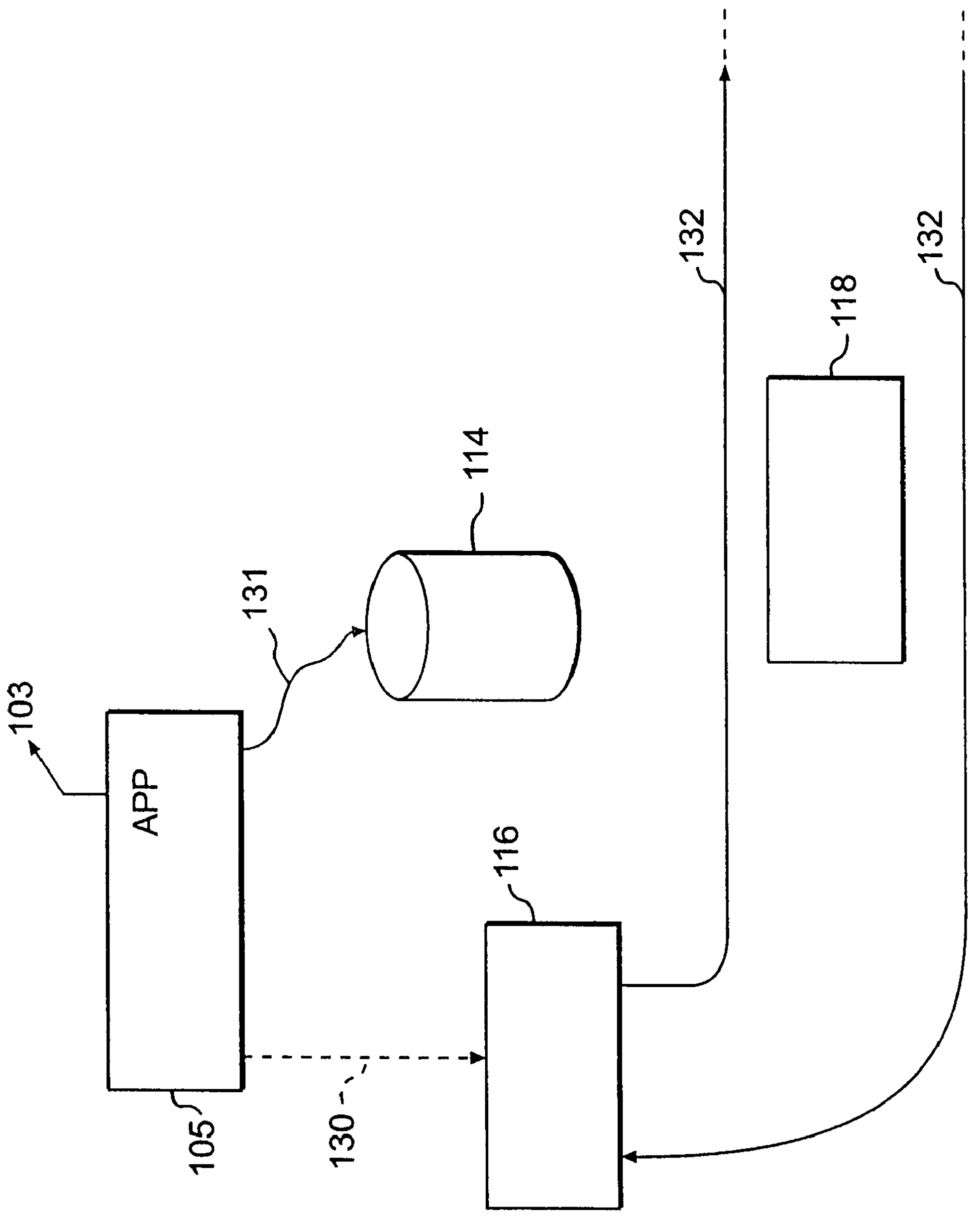
FIG. 1D illustrates a high-level diagram of the logical sublayer of apparatus 100, according to an embodiment of the present invention.

FIG. 1D illustrates a high-level diagram of the logical sublayer of apparatus 100, according to an embodiment of the present invention. At the logical sublayer, apparatus 100 operates using software 105 that receives an alert signal 130 from alert function block 116, a link 131 connecting to a storage volume 114, a I/O activity table 118 and a notification/remote mirror pair link 132. An application 103 runs at the primary storage group 101. A similarly configured application 104 runs at the secondary storage group 102.

Figure 1E:
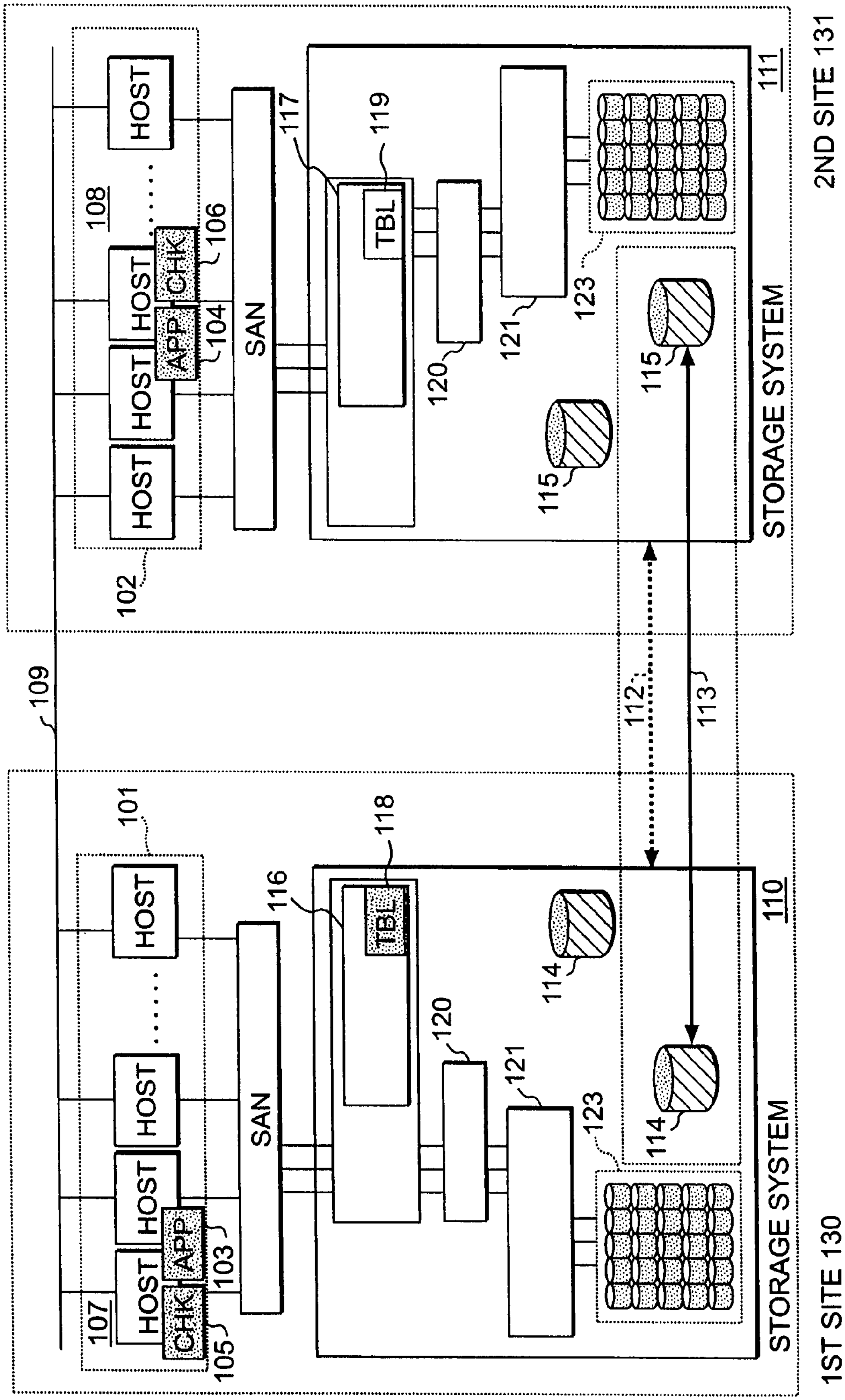
FIG. 1E is a schematic diagram illustrating a basic configuration for the physical sublayer of apparatus 100 and for the logical sublayer of apparatus 100.

FIG. 1E is a schematic diagram illustrating a basic configuration for the physical sublayer and the logical sublayer of apparatus 100. The physical sublayer of apparatus 100 comprises the primary host group 101 and secondary host group 102 connected together via the network 109. Primary host group 101 and secondary host group 102 are each connected with a corresponding primary SAN 120 and secondary SAN 121 through a plurality of host/SAN data interchange links 124 and 125, respectively. Each SAN 120 and 121 is connected through multiple SAN/storage system links to a corresponding storage system 110 or 111. Primary host group 101 and secondary host group 102 each comprises a plurality of hosts. Within each plurality of hosts 101.1 through 101.N and hosts 102.1 through 102.N, one host is elected as master host. In FIG. 1E, the master host from primary host group 101 is designated 107. From secondary host group 102, the master host is designated 108.

Through network 109 within the clustering system, master host 107 and master host 108 transfer a heartbeat signal to each other and perform what is called heartbeat checking. Through heartbeat checking, master host 107 and 108 check whether the other is alive or not, and to determine if a failover process should be performed in order to either continue operation or to restore operation of the failing host or host group. Specifically, each master host checks if the other master host is capable of receiving a heartbeat message and of returning a corresponding response. If the master host of one host group determines that the master host of the other host group has failed, the host group with the failing master host will select a new master host for the group based on a predetermined protocol. For example, if host 107 in the primary host group 101 fails the heartbeat check conducted by master host 108, the primary host group 101 will select a new master host (i.e., 107*a*). Vice versa, if host 108 in the secondary host group 102 fails the heartbeat check conducted by master host 107, the secondary host group 102 will select a new master host (i.e., 108*a*).

At the logical sublayer shown in FIG. 1E, master host 107 includes an operating system (not illustrated in the figure and customarily embedded in either master host 107), along with application 103 and checking software 105. Similarly, master host 108 includes its operating system, along with application 104 and checking software 106. Software 105 and software 106 perform respective resource monitoring functions by conducting the heartbeat check and monitoring whether the applications software and devices of the host they respectively watch are alive. While application 103 of master host 107 runs normally at the primary group 101, application 104 of master host 108 is maintained in standby mode, as is conventionally done in the case of cluster computing systems.

Software 105 performs the heartbeat check by determining whether or not the application software and the devices of master host 108 are alive based on its interpretation of the responses from the application software and devices of master host 108. If a failure is detected within the host group being checked, or if the resource monitoring function of software 106 is determined by software 105 not to be working anymore or if the resource monitoring function 106 finds that the resource monitoring function within software 105 is not alive anymore, then the application 103 fails-over to a standby site.

As noted above, each storage system 110 and 111 comprises a plurality of storage volumes 114 and 115, respectively. As illustrated in FIG. 1E, the plurality of storage volumes are implemented in one embodiment as a plurality of disks in the physical sublayer for apparatus 100. Corresponding storage volumes 114 and 115 are connected to each other by the plurality of remote links 112. The remote links 112 are communication links between storage systems 110 and 111 that can be realized through physical sublayers such as ESCON, fiber channels, telecommunication lines, dark fibers or a combination thereof. In addition, one or more remote mirror links 113 connect storage volumes 114 in storage system 110 with storage volumes 115 in storage system 111. The remote mirror links 113 are used for data mirroring between the storage volumes and to facilitate the transmission of data updates between the storage systems of the primary and secondary host groups, depending on the configuration.

As discussed above, within storage systems 110 and 111, each of the activity monitor and alert function blocks 116 and 117 perform activity monitor and the alert functions in their respective storage systems; each incorporates an alert engine 128 and a monitor engine 129. Each block 116 and 117 includes an I/O activity table 118 and 119. In particular, each of I/O activity tables 118 and 119 stores a list of target volumes and target storage systems for a target site/host and a corresponding list of changes in the status of the target site/host. Due to interruptions in the activity monitor and in the alert function that might occur within blocks 116 and 117, the I/O activity tables are not always active so the monitoring and alert functions might be interrupted also at the level of the logical sublayer. Activity monitor and alert function blocks 116 and 117 send and receive information to and from the tables using remote links such as through the remote mirror link 113.

Figure 1F:
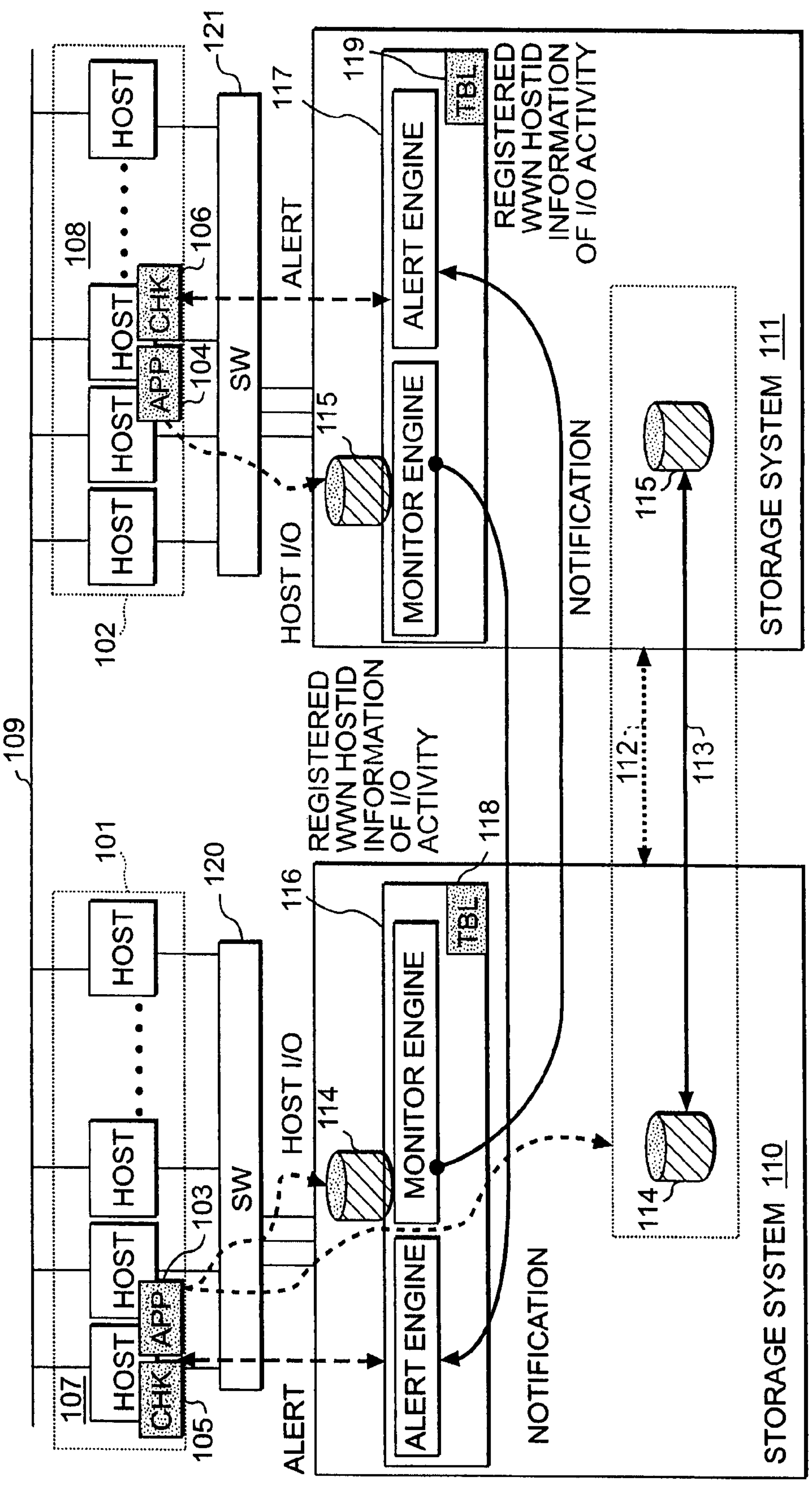
FIG. 1F is a schematic diagram for the logical sublayer of apparatus 100.

FIG. 1F is a schematic diagram for the logical sublayer of apparatus 100. In general, in primary host group 101 and its corresponding storage system 110, the monitor engine 129 would send notification signals to the alert engine 128 of the activity monitor and alert function block 117 of the storage system 111 of secondary host group 102. Correspondingly, in secondary host group 102 and its corresponding storage system 111, the monitor engine 129 would send notification signals to the alert engine 128 of the activity monitor and alert function block 116 of the storage system 110 of primary host group 101. Software 105, 106 and particularly applications 103,104 will communicate with the alert engine 128 of their corresponding activity monitor and alert function block 116, 117 to determine whether any notification signals are received from the monitor engine 129 of the opposing activity monitor and alert function block. The applications 103,104 will correspondingly communicate with their respective storage volumes 114, 115. Further discussion of this operation will be provided herein in connection with the description of FIG. 10.

Figure 2A:
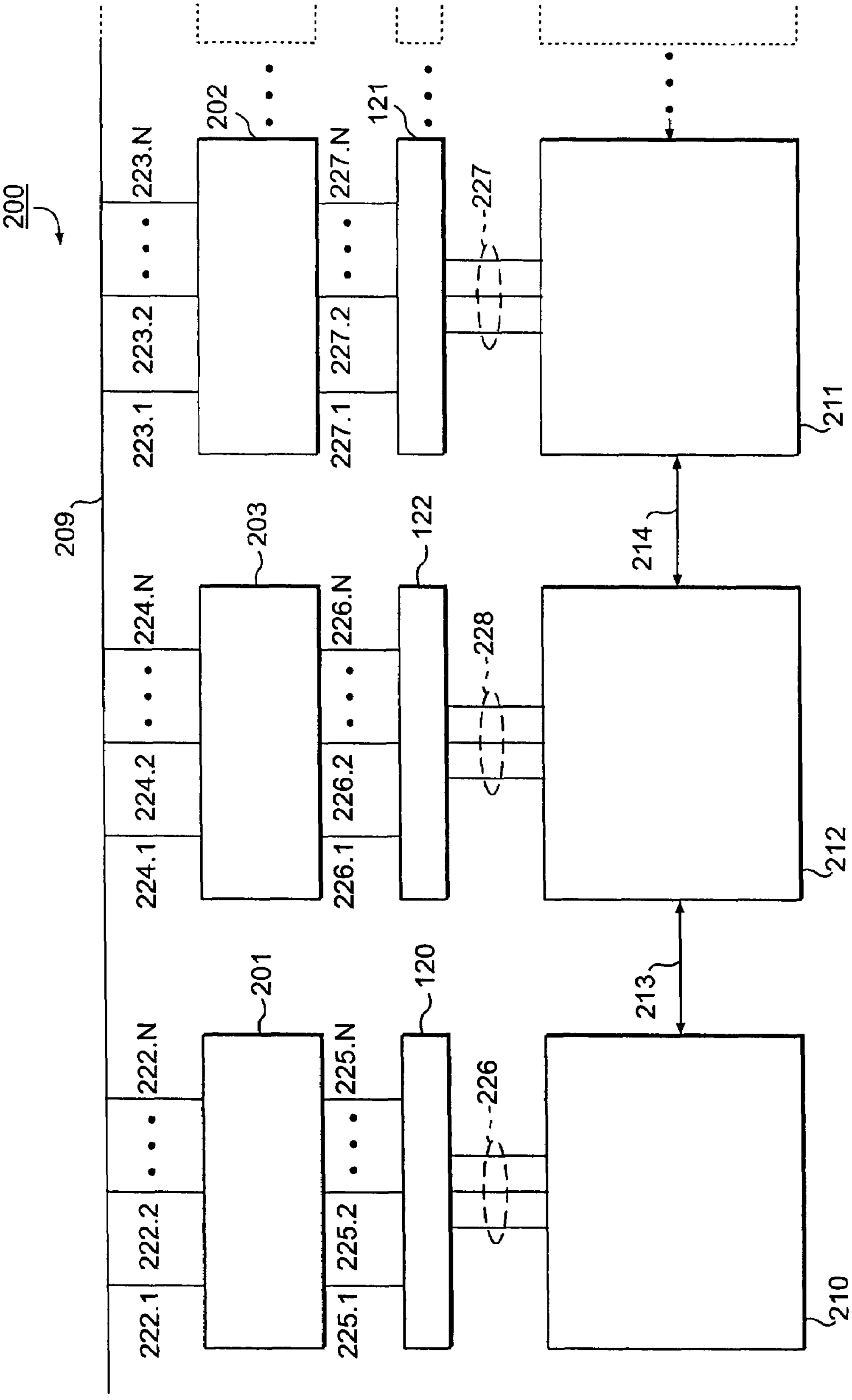
FIG. 2A illustrates a high level block diagram of a basic configuration of a heartbeat apparatus via a remote monitoring link with three-site multi-hoop configuration, according to an embodiment of the present invention.

FIG. 2A illustrates a high level block diagram of a basic configuration of a heartbeat apparatus via a remote monitoring link with a three-site multi-hoop configuration, according to an embodiment of the present invention. Apparatus 200 comprises a network 209 that facilitates communication among the clustered storage systems 210, 211 and 212. A primary host group 201 operating in conjunction with storage system 210 is connected to network 209 through a plurality of network/data interchange links 222.1-222.N. The primary host group 201 is connected with SAN 120 through a plurality of primary host/SAN data interchange links 225.1 to 225.N. SAN 120 is connected with primary storage system 210 through a plurality of SAN/storage system links 226.

In an analogous manner, secondary and tertiary host groups 202,203 are connected to the network 209 via their respective host/SAN data interchange links 223.1 to 223.N and 224.1 to 224.N. The secondary host group 202 is connected with SAN 121 through a plurality of secondary host/data interchange links 227.1-222.N. SAN 121 and its corresponding secondary storage system 211 are connected through a plurality of SAN/storage system links 227. The third host group 203 is connected with network 209 through a plurality network/third host data interchange links 224.1-224.N. Third host group 203 is connected with SAN 122 through a plurality of third host/SAN data interchange links 226.1-222.N. SAN 122 is connected with third storage system 212 through a plurality of SAN/storage system links 228.

Primary storage system 210 is connected with third storage system 212 through a remote link 213. The third storage system 212 is connected with the secondary storage system 211 through a remote link 214. Each of the primary host group 201, secondary host group 202, and tertiary host group 203 is composed of a plurality of hosts 201.1-201.N, 202.1-202.N and 203.1-203.N, respectively.

As described in connection with apparatus 100 and illustrated in FIG. 1D, each of the primary host group 201, secondary host group 202, and third host group 203 elects among its corresponding plurality of hosts at least one master host (i.e., 207, 208, 210). All hosts that are among any of the host groups 201, 202, or 203 are connected with each other by network 209. Typically, network 209 is a LAN or a WAN. Network 209 serves as means for clustering the systems within an apparatus as illustrated in FIG. 2A. As with the previously described embodiment of the invention, the master hosts 207, 208 and 210 perform heartbeat checks on each other through the connecting capabilities provided by network 209.

The presence of the third host group 203, along with its corresponding SAN 122 and storage system 212, is not mandatory for purposes of the general operation of the apparatus 100. Its presence will depend on the type of failover process adopted by the users of the network. For example, if interruption of service is detected in the primary host group 201, the failover process to restore the functions performed by the primary host group 201 may include having the secondary host group 202 take over those functions, while the tertiary host group 203 takes over the functions and/or status previously assigned to the secondary host group 202. If however both the primary host group 201 and secondary host group 202 fail to perform their functions, then one implementation of the failover process may include the tertiary host group 203 taking over the functions of one or both the failing primary and secondary host groups and/or taking steps to restore operation of one or both failing host groups. In such a scenario, the presence of the tertiary host group 203 is necessary to maintain operation and prevent catastrophic loss of service. Other scenarios include failure of the secondary host group 202 that then initiates a failover process of the primary host group 201 taking over the functions of the secondary host group 202 or the tertiary host group 203 taking over the functions of the second host group 202.

Figure 2B:
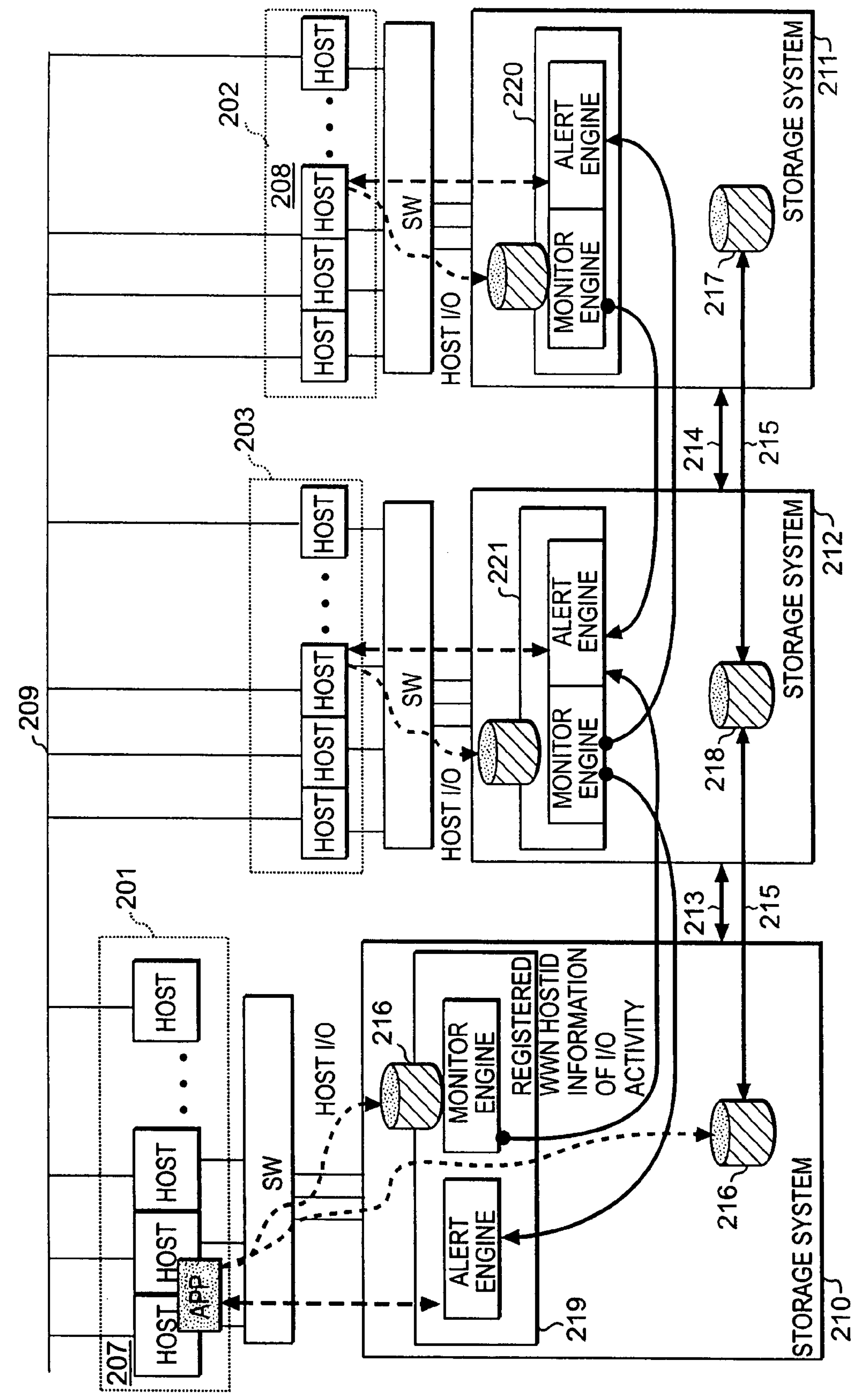
FIG. 2B is a schematic diagram illustrating a basic configuration for the physical sublayer of apparatus 200 overlayed with the logical sublayer of apparatus 200.
Figure 2C:
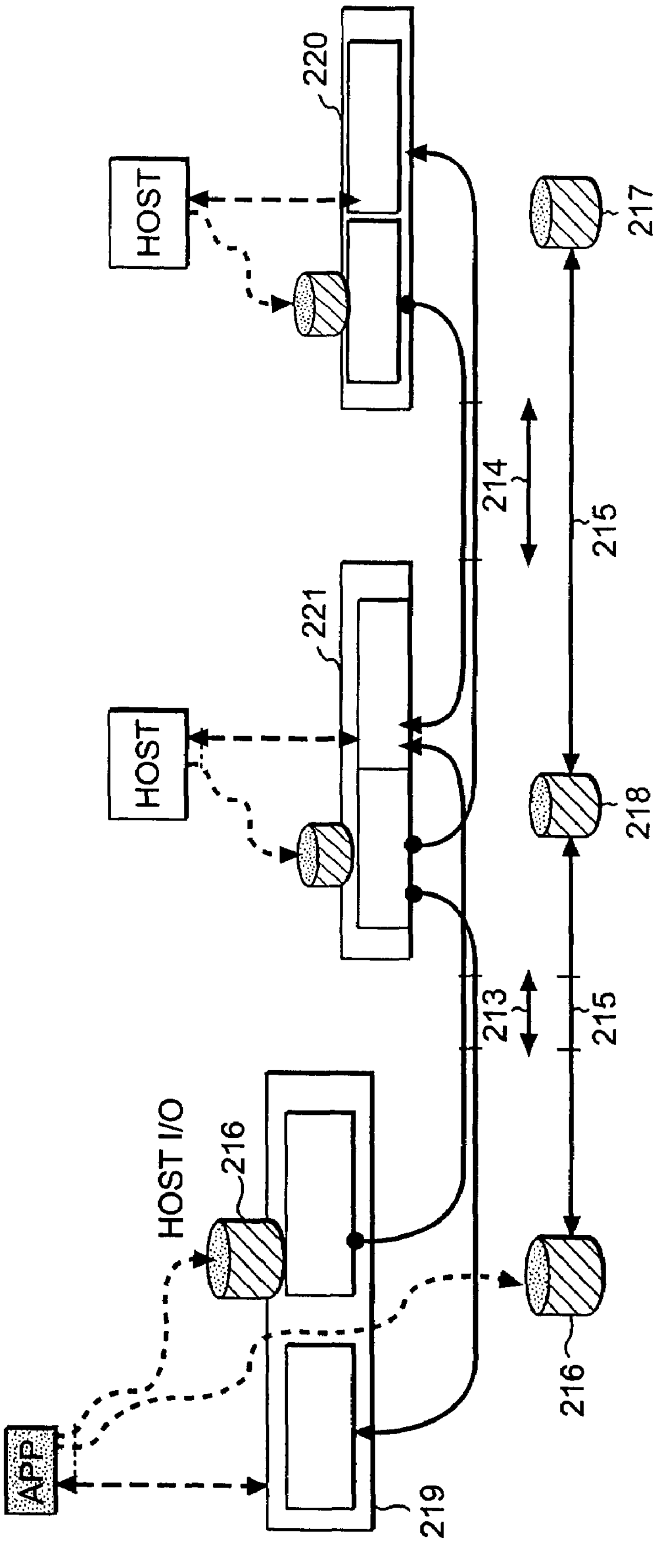
FIG. 2C is a schematic diagram illustrating the logical sublayer of apparatus 200.

FIG. 2B is a schematic diagram illustrating a basic configuration for the physical sublayer of apparatus 200 overlayed with the logical sublayer of apparatus 200, while FIG. 2C is a schematic diagram illustrating just the logical sublayer of apparatus 200.

Similar to the operation of the previously described embodiment at the logical sublayer level, in primary host group 201 and its corresponding storage system 210, the monitor engine would send notification signals to the alert engine of the activity monitor and alert function block 220 of the storage system 211 of secondary host group 202 and to the activity monitor and alert function block 221 of the storage system 212 of tertiary host group 203. Correspondingly, in secondary host group 202 and its corresponding storage system 211, its monitor engine would send notification signals to the alert engine of the activity monitor and alert function block 216 of the storage system 210 of primary host group 201 and to the alert engine of the activity monitor and alert function block 221 of the storage system 212 of tertiary host group 203. Further, in tertiary host group 203 and its corresponding storage system 212, its monitor engine would send notification signals to the alert engine of the activity monitor and alert function block 220 of the storage system 211 of secondary host group 202 and to the alert engine of the activity monitor and alert function block 216 of the storage system 210 of primary host group 201. As in the previous embodiment, the storage systems and their corresponding storage volumes are implemented using pluralities of disks.

The relevant software and/or applications residing in each of the host groups 201,202,203 will communicate with their corresponding alert engines of their corresponding activity monitor and alert function blocks 216,220,221, respectively, to determine whether any notification signals are received from the monitor engines of the activity monitor and alert function blocks of the other host groups. The applications will correspondingly communicate with their respective storage volumes 216, 217,218. The storage systems 210, 211, 212 communicate with each other via remote links 213, 214, where remote links 213 connect storage systems 210 and 212, and remote links 214 connect storage systems 211 and 212. Further, remote mirror links 215 connect storage volume 216 to storage volume 218, and storage volume 217 to storage volume 218. It should be noted that in this configuration, there are no remote links connecting the primary host group 201 and its storage system 210 to the secondary host group 202 and its storage system 211. Rather, the tertiary host group 203 and its storage system 212 are connected to and between the primary and secondary host groups and their respective storage systems.

Updates of data can be sent between the storage volumes of each storage system, especially during the times that the primary and secondary storage systems are configured. For example, an application issued by the main host 207 through software residing within it sends a host inquiry to storage volume 216. The application also addresses the alert engine of the activity monitor and alert function block 219. Data from the I/O activity table associated with the function block 219 is interchanged with the monitor engine. The host inquiry issued by the application towards the storage system can receive from the monitor engine an ACTIVE or DEAD status reply. The same operational sequence is valid regarding blocks 220 and 221.

Figure 3:
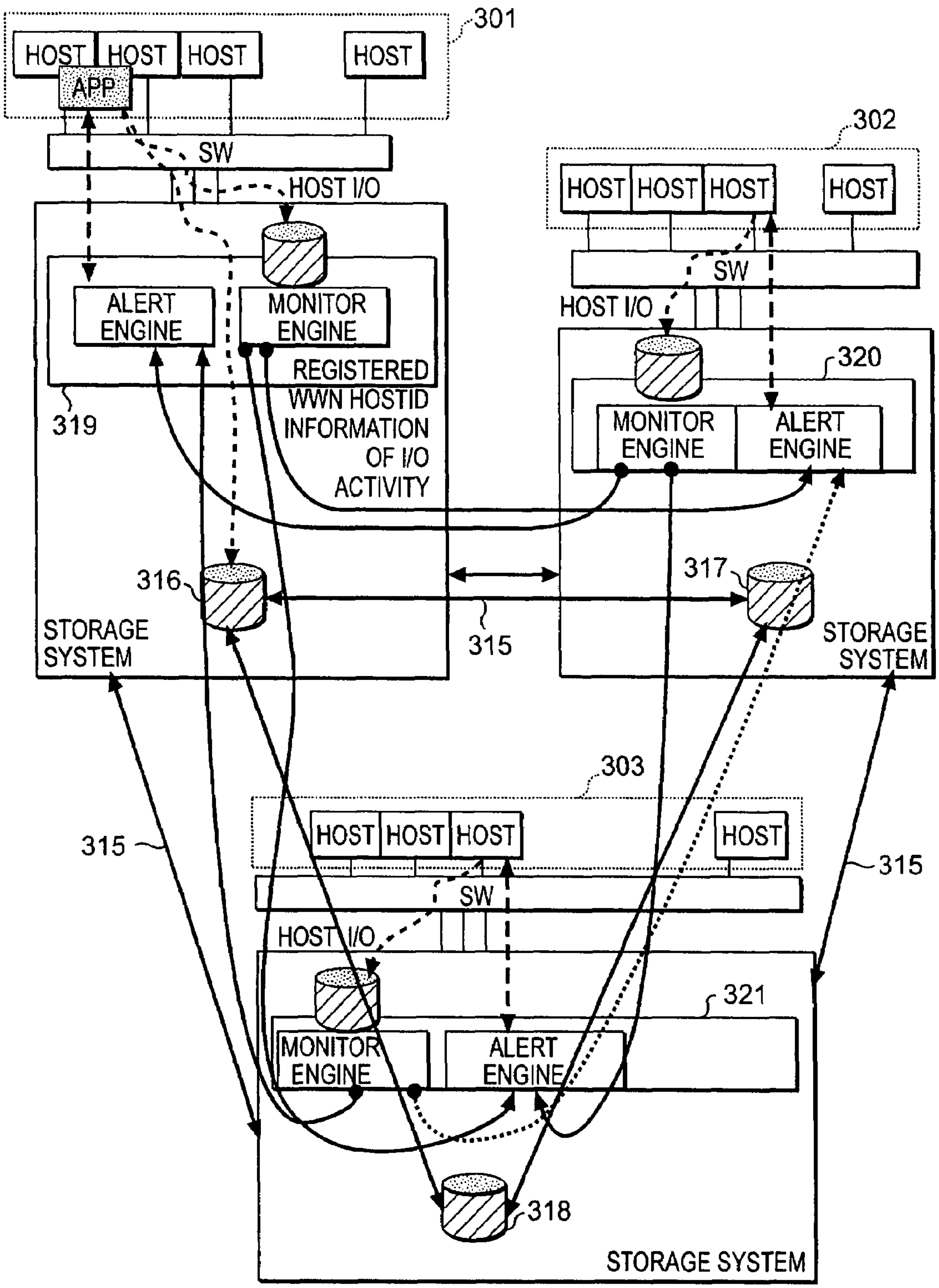
FIG. 3 illustrates a high level block diagram of a basic configuration of a heartbeat apparatus via a remote monitoring link with a three-site hoop configuration, according to an embodiment of the present invention and its logical sublayer.

FIG. 3 illustrates a high level block diagram of another embodiment of the present invention that comprises a basic configuration of a heartbeat apparatus via a remote monitoring link with a three-site hoop configuration, according to its physical and logical sublayers.

Analogous to the structure of apparatus 200, the apparatus 300 as illustrated in FIG. 3, incorporates three subsystems, namely the primary, secondary and tertiary host groups 301, 302, 303 respectively. Each host group comprises a plurality of hosts, a SAN and a storage system which are connected with each other through corresponding host/SAN data interchange links, and connected with other groups through corresponding remote land remote mirror links 315.

This embodiment of the present invention differs from the apparatus 200 in that there exists at least one additional connection between the primary and secondary host groups. Another difference is that the apparatus 300 does not incorporate a network such networks 109,209 that interconnects the different host groups to one another. Rather, remote link connections are made between the primary and the tertiary host groups, between the secondary and the tertiary host groups, and between the primary and secondary host groups. The remote link connections include both remote links and remote mirror links that are established between the storage systems of the host groups and/or their respective components (i.e., storage volumes 316,317,318).

As noted above with respect to FIG. 3, in primary host group 301 and its corresponding storage system, the monitor engine of the activity monitor and alert function block 319 would send notification signals to the alert engine of the activity monitor and alert function block 320 of the storage system of secondary host group 302 and to the activity monitor and alert function block 321 of the storage system of tertiary host group 303. Correspondingly, in secondary host group 302 and its corresponding storage system, its monitor engine would send notification signals to the alert engine of the activity monitor and alert function block 319 of the storage system of primary host group 301 and to the alert engine of the activity monitor and alert function block 321 of the storage system of tertiary host group 303. Further, in tertiary host group 303 and its corresponding storage system, its monitor engine would send notification signals to the alert engine of the activity monitor and alert function block 320 of the storage system of secondary host group 302 and to the alert engine of the activity monitor and alert function block 319 of the storage system of primary host group 301. As in the previous embodiments, the storage systems and their corresponding storage volumes are implemented using pluralities of disks.

The relevant software and/or applications residing in each of the host groups 301,302,303 will communicate with their corresponding alert engines of their corresponding activity monitor and alert function blocks 319,320,321, respectively, to determine whether any notification signals are received from the monitor engines of the activity monitor and alert function blocks of the other host groups. The applications will correspondingly communicate with their respective storage volumes 316,317,318. The storage systems 310, 311, 312 communicate with each other via remote links 315, where remote links connect storage systems 310 to 312, storage systems 311 to 312, and storage systems 310 to 311. Further, remote mirror links 315 connect storage volume 316 to storage volume 318, storage volume 317 to storage volume 318, and storage volume 316 to storage volume 317.

Except as otherwise noted above or hereinbelow, apparatus 300 performs the same functions and in the same manner as the prior embodiments discussed above. The functions performed by apparatus 300 are the same as the functions performed by apparatus 200 and 100. FIG. 3C is a schematic diagram illustrating a basic configuration for the physical sublayer and logical sublayer of apparatus 300.

The above illustrated embodiments for the apparatus of heartbeat check via remote mirroring link on multi-site, which are applicable to the various embodiments of the invention, are mainly used for system activity monitoring and for alert generation. These functions can be performed either by the storage system or by the hosts or a combination of the two components. The sequence that leads to performing either activity monitoring or alert generating comprises three main segments: the monitor function, the notification function and the alert function.

One possible sequence for the operation of the activity monitor and alert function block (i.e., 116,117,216,220,221, 319,320,321) in the corresponding storage system is that the storage system that includes a targeted storage volume and is connected to targeted hosts is used to determine the activity status of the storage system and/or its corresponding host group depending on the configuration used. The storage system that has the targeted volume and initiates the notification function. Specifically, the storage system sets or stores alert information in a specified area or location in storage. At least the master host and/or another host in the host group that is designated to perform the function surveys that area or location periodically.

Another possible sequence for the operation of the activity monitor and alert function block is that one storage system that is designated as a targeted storage system is used to determine the activity status of its corresponding host or host group depending on information about activity from that targeted storage system. The targeted storage system issues the alert signal (such as SNMP trap) for its corresponding hosts or host group.

The monitoring function is responsible for monitoring the I/O activity (for example, commands such as Write, Read, Inquiry, and all other commands) being conducted between the storage volumes and any of the plurality of hosts associated with the storage system that includes the subject storage volumes. An I/O activity or configuration table, such as 118, summarizes the monitoring activity and the monitored functions. The table 118 and its contents will be described in detail further hereinbelow in connection with FIG. 5.

Figure 4A:
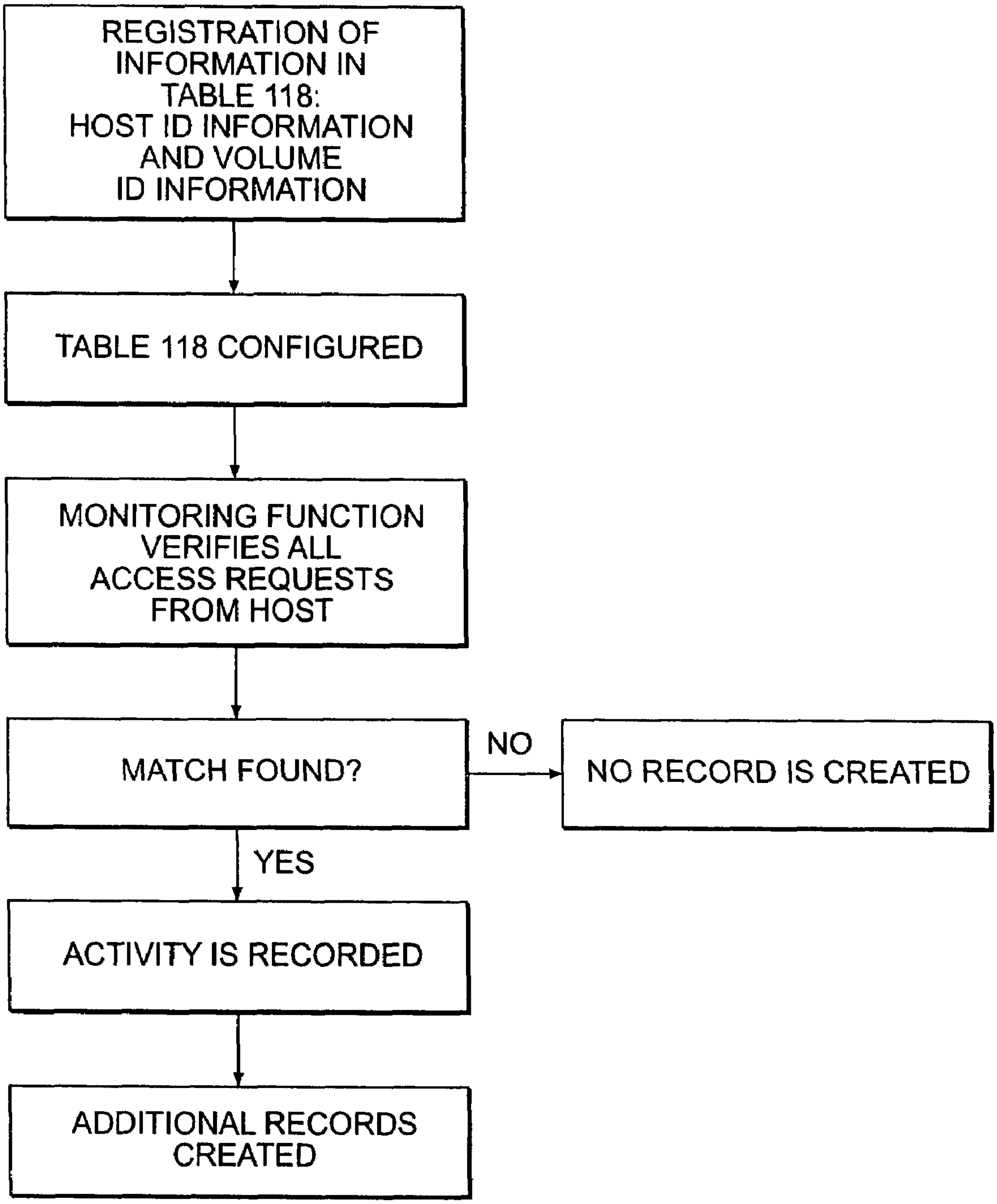
FIG. 4A is a schematic diagram illustrating an overview of the monitoring function.

FIG. 4A illustrates a flowchart that summarizes the sequence for the monitoring function. First, the identification information on every host in the host group that is the subject of the monitoring function, such as Host ID, WWN of HBAs, the host name, etc., is registered in the table 118. The volume identification information such as the logical volume ID is also registered in table 118. After configuring the table 118, the monitoring function verifies all access requests from a subject host (e.g., the master host). If the information from the protocol frame of every access request matches with one corresponding to a registered host and a registered volume, the function records the activity and additional records are created. Types of activity recorded are I/O frequency, Write/Read IOPS, port usage, etc.

Figure 4B:
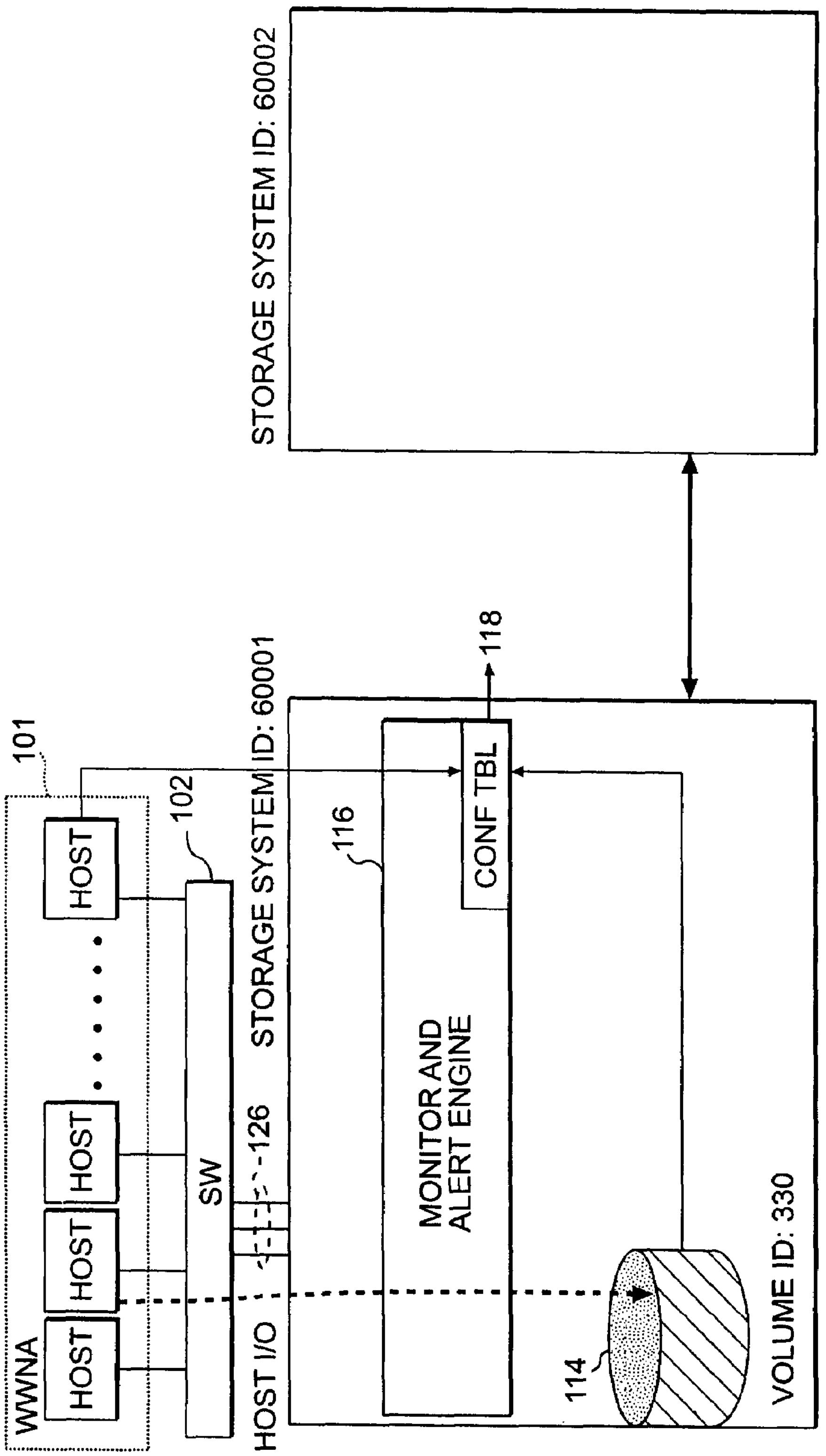
FIG. 4B is a schematic diagram illustrating the logical sublayer of the monitoring function within the example heartbeat apparatus.

FIG. 4B illustrates the logical sublayer for the monitoring function within the system. The identification information pertaining to the plurality of hosts 101 is registered in I/O activity or configuration table 118. Volume ID information (i.e., the ID information pertaining to the plurality of storage volumes 114 of storage system 110) is also registered in table 118. Based on this information, table 118 which resides within activity monitoring and alert function block 116 is configured. Further, the monitoring function verifies all access requests made by the plurality of hosts 101. If a match is found, the activity is recorded by the activity monitoring and alert function block 116. Also, additional records regarding target storage system ID information and time intervals for notification signals are registered. The target storage system ID information includes serial number, IP address of service processor, etc.

FIG. 5 illustrates an example of an I/O activity or configuration table 500. Configuration table 500 records data such as configuration ID 502, enable 503, volume ID 504, host 505, interval 506, threshold 507, activity 508, status 513, and storage 514. Configuration table 500 is stored in a table storage element of an activity monitoring and alert function block (e.g., 116,117), as illustrated by FIG. 1D. Configuration ID 502 is a unique ID assigned to a specific configuration. Enable 503 illustrates the configuration's enable/disable function status. Volume 504 defines the identification information for the target volume. Host 505 shows a definition of the identification information for the target hosts. Interval 506 shows a definition of the interval of activity notification (time). Threshold 507 shows a definition for the maximum value of time access interval for determining the status.

Activity 508 is defined information 509 through 512 stored in their respective columns. Frequency of access 509 indicates the time average access interval per individual access. Write IOPS 510 shows the average "WRITE" access numbers per second. Read IOPS 511 shows the average "READ" access numbers per second. Port usage 512 indicates an average usage rate of the port the relevant host accessed.

Status 513 indicates the status of the activity monitor. The options are "LIVE" or "DEAD", in accordance with the threshold setting. Storage system 514 indicates the definition of the identification information for the target storage system if the notification of activity information is periodically initiated.

The hosts in the host group 101 can establish the configuration of the I/O activity or configuration table via in-band or out of band. Alternatively, the configuration of the table may be performed via a service processor on the storage system of the relevant host group. Each storage system can individually request the activity information from another storage system via the remote links between them.

With respect to the notification function, as mentioned above, the I/O activity or configuration table 118 includes field 514 that stores the definition of identification information about the target storage system. Using the data of field 514, the notification function periodically sends notification or status information to the target storage system. The target storage system receives this information.

Figure 6:
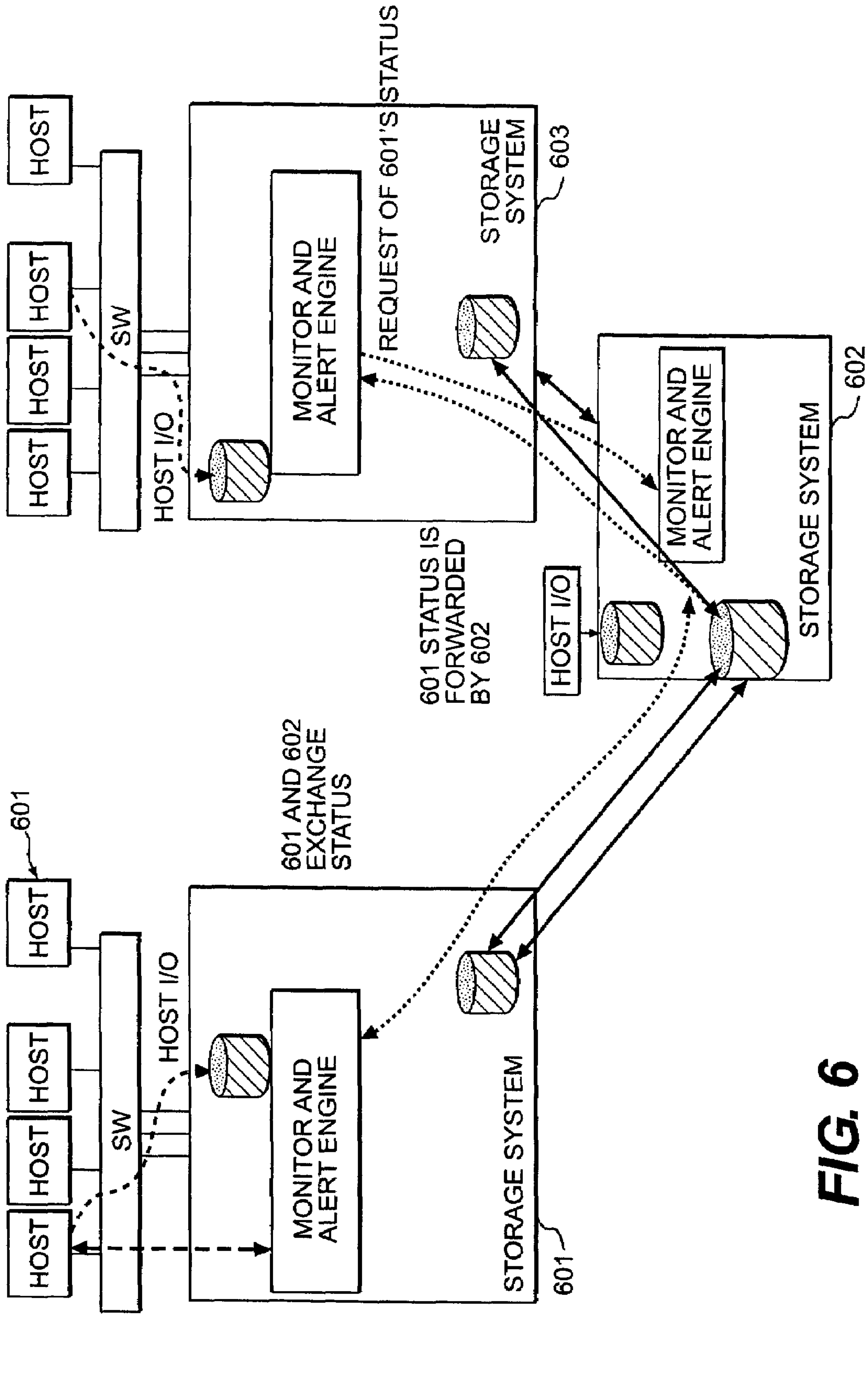
FIG. 6 is a schematic diagram of obtaining the status of the activity monitor function.

One way for the target storage system to obtain the status information is illustrated in FIG. 6. In an exemplary loop configuration, storage system 601 sends a request for the status of the activity monitor function to storage system 603 that is not connected directly to storage system 601. Storage system 601 sends a request to storage system 602 that is connected directly to the storage system 603 through a plurality of remote links and remote mirror links.

The activity monitoring and alert function block and the storage system 601 of the requesting host group receive the status information on the activity monitor of storage system 603 via the remote links between the storage systems.

With regard to the alert function, two possible implementations for this function include:

a. The alert function on the storage system setting the status information on the activity monitor in a specific storage area (for example, Local Memory) on the storage system. The host can retrieve the information periodically via in-band or out of band data links; or b. The alert function on the storage system periodically sending alert signals via out of band communication (for example, using an SNMP trap).

Figure 7A:
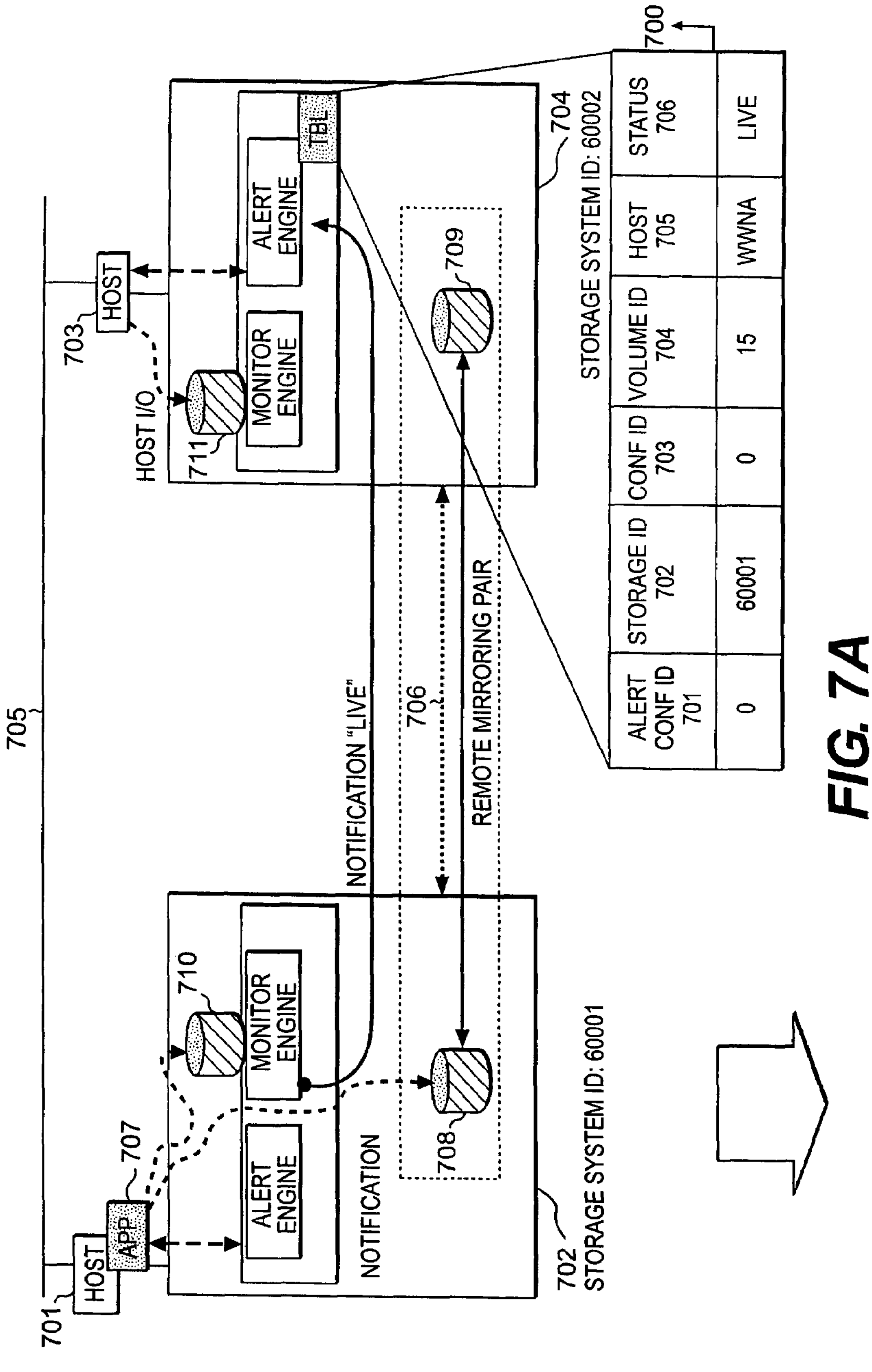
FIG. 7A illustrates an usage example for the monitor activity diagram, according with one embodiment of the present invention.
Figure 7B:
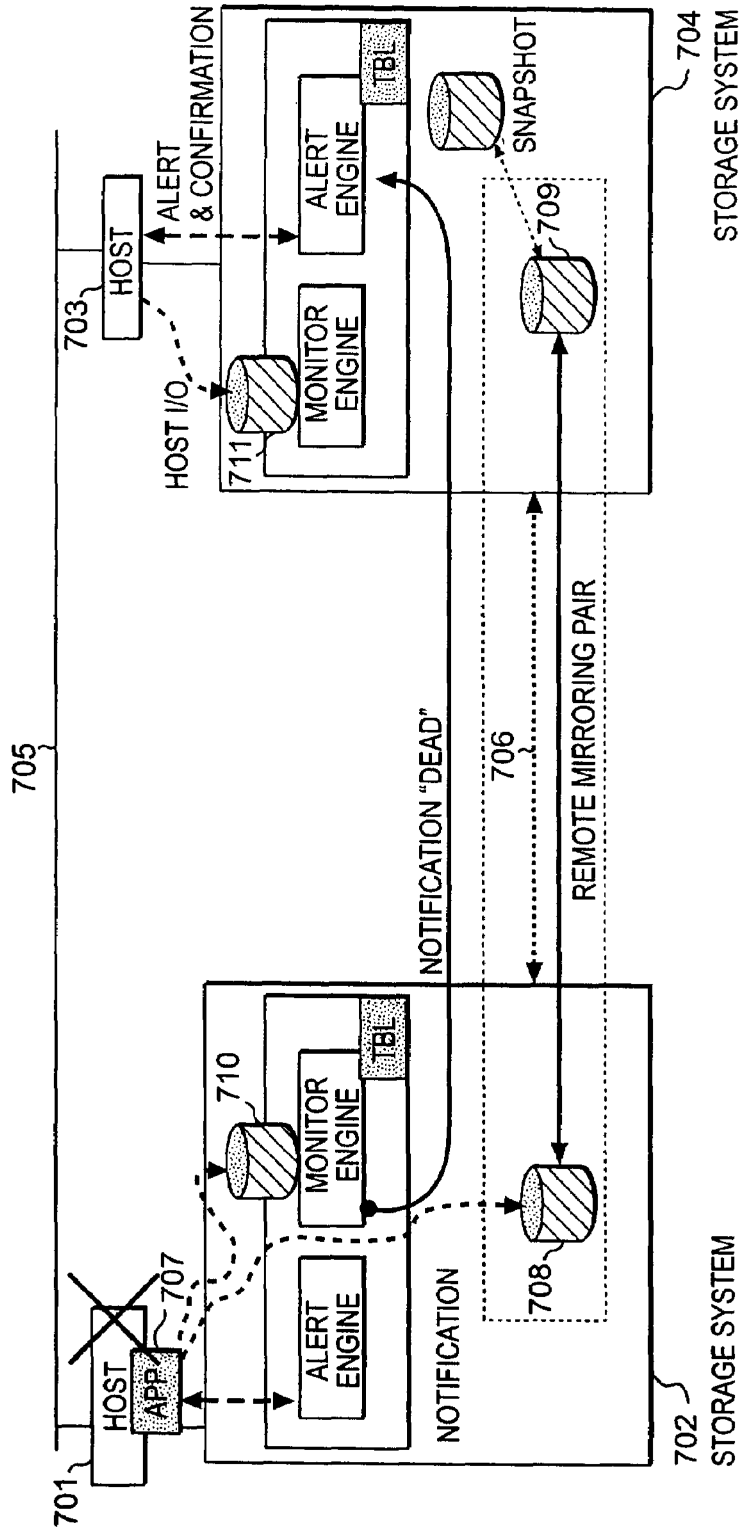
FIG. 7B illustrates another usage example for the monitor activity diagram, according with another embodiment of the present invention.

FIGS. 7A and 7B illustrate usage examples for the monitor function. The primary host group comprises at least host 701 that is connected to a storage system 702. The secondary host group comprises at least host 703 connected to the storage system 704. Hosts 701 and 703 are connected to each other via a network link 705, such as an Ethernet network. Storage systems 702 and 704 are connected to each other via a remote link 706 that is implemented via, for example, FC and ESCON.

A received status manage table 700 is created based on notification information. Table 700 comprises the following information: alert configuration ID 701, source storage system information 702, configuration ID 703, volume 704, host 705, and status 706. Alert configuration ID 701 indicates a unique ID for the configuration related to the alert function. Storage system 702 indicates the source storage system for the status of activity information. Configuration ID 703 indicates an unique ID for the configuration related to the activity monitor. Volume 704 indicates the definition of the identification information for the target volume. Host 705 indicates the definition of the identification information for the target hosts. Status 706 indicates the status of the activity monitor. Examples of status are "LIVE", "DEAD", etc. The status depends on the threshold setting. If the status of the primary storage system is "DEAD" the alert function is activated.

Users can configure a correlation between a remote mirroring pair group (i.e., a pair of storage systems or storage volumes connected to each other via remote mirror links), the activity monitor function and the alert function configuration. If such a correlation is configured, the secondary storage system can perform the fail-over process for the remote mirroring pair when the status of the related configuration for the alert function on the primary storage system is "DEAD".

As shown in FIGS. 7A and 7B, an application 707 is running on host 701 and uses storage volume 708 of the storage system 702. Volume 708 and volume 709 of storage system 704 are configured as a remote mirroring pair. The ID associated with the pair is the same on both systems. This way the data for application 707 is duplicated on the remote system. Application 707 on host 701 uses storage volume 710 as local data storage. Host 703 uses storage volume 711 as local data storage.

The usage of the activity monitor function consists of a sequence of steps. According to one embodiment, the user first configures the activity monitor and alert function on the primary host group via an in-band or out of band interface. For example, its configuration ID is #0, its volume is volume 708 with associated ID #1000, the host is host 701 with associated ID #809a58c9 or WWN 10.00.00.00.C9.20.D4.C1, the interval is 10 seconds, the threshold is set at 30 seconds, and the storage system is storage system 704 with associated serial number #20021 or IP address 10.30.20.40.

The user next configures the activity monitor and alert function on the secondary host group via an in-band or out of band interface. For example the configuration ID is #0, the volume elected is volume 709 with ID #1000, the host is host 703 with ID #809a66aa or WWN 0.00.00.00.C9.20.D4.EF, the interval is set at 10 seconds, the threshold is set at 30 seconds, the storage system is storage system 702 with serial number #20001 or IP address 10.30.20.10.

Next, the user configures the alert function configuration on primary host group via an in-band or out of band interface. For example, the alert configuration ID is #0, the elected storage system is storage system 704, the configuration ID is #0, the volume is volume 709, the elected host is 702, the related pair ID is #0004, the auto fail-over function is set as enable, and the confirmation is yes, indicated as necessary.

Next, the user configures the activity monitor and alert functions on the secondary host group via an in-band or out of band interface. For example, the alert configuration ID is #0, the elected storage system is 702, the configuration ID is #0, the elected volume is 708, the host is host 701, the related pair ID is #0004, the auto failover function is set as enable, and the confirmation is yes, indicated as necessary.

The user then enables the configuration. Each storage system's alert function receives status information, such as "LIVE", for each configuration. Hosts 701 and 703 are accessing storage volumes 708, 709, 710 and 711. This is a "normal" operating situation. If primary host group failure occurs, its activity status and its indicator become "DEAD".

Afterwards, the alert function sets the information for the host designated to survey the failure (i.e., the secondary host group). Alternatively, the alert function sends a warning signal about the "DEAD" condition. The host receiving the warning about the "DEAD" condition then starts the failover process for remote mirroring pairs affected by the storage volumes of the failed primary host group.

With the fail-over process initiated, the secondary storage system 704 pushes the primary storage system 702 to send the pending data quickly, as if it would be functioning in an asynchronous remote mirroring mode. Further, while the failover process is initiated, the secondary storage system 704 confirms that the volume 709 is in a consistent status. That means that there is no pending data in storage system 702. During the failover process, the secondary storage system 704 takes a snapshot of volume 709.

The storage system 704 prepares for the completion of the faster failover process, and then waits for the confirmation (indication) from the secondary host group to accomplish the failover. Confirmation is in the form of a user input indicating whether or not completion of the failover is desired. If the user indicates to continue with the failover, the snapshot volume and the secondary volume are swapped in the virtual volume layer in order to provide the same volume ID for the user. This process is not transparent to the user. If the user indicates to discard the failover, the snapshot volume is also discarded.

If a primary storage system or remote link failure occurs, one implementation for the failover process would be to have the host receiving the warning about the "DEAD" condition (i.e., the secondary host group) start the failover process only after a predetermined communication timeout period during which status of activity data should be received has elapsed. If the primary storage system responds within the timeout period, initiation of the failover process is canceled. If the primary storage system fails to respond within the timeout period, failover is then initiated for the remote mirroring pairs affected by the storage volumes of the failed primary host group. In such an event, the secondary storage system would determine the location or site of the primary storage system failure and initiate the failover process for the affected remote mirroring pairs.

Figure 8A:
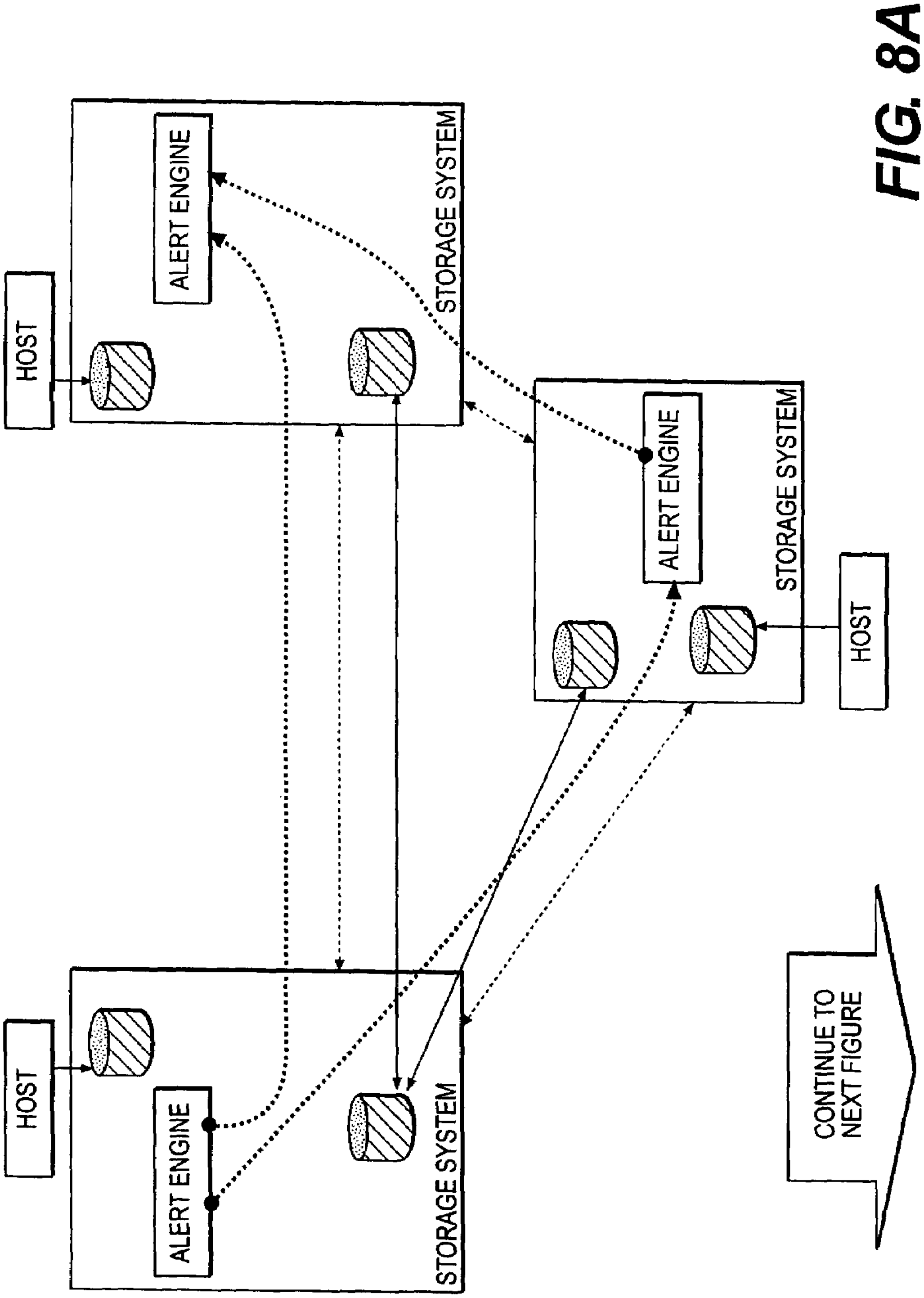
FIG. 8A illustrates another usage example for the monitor activity step A, according to another embodiment of the present invention.
Figure 8B:
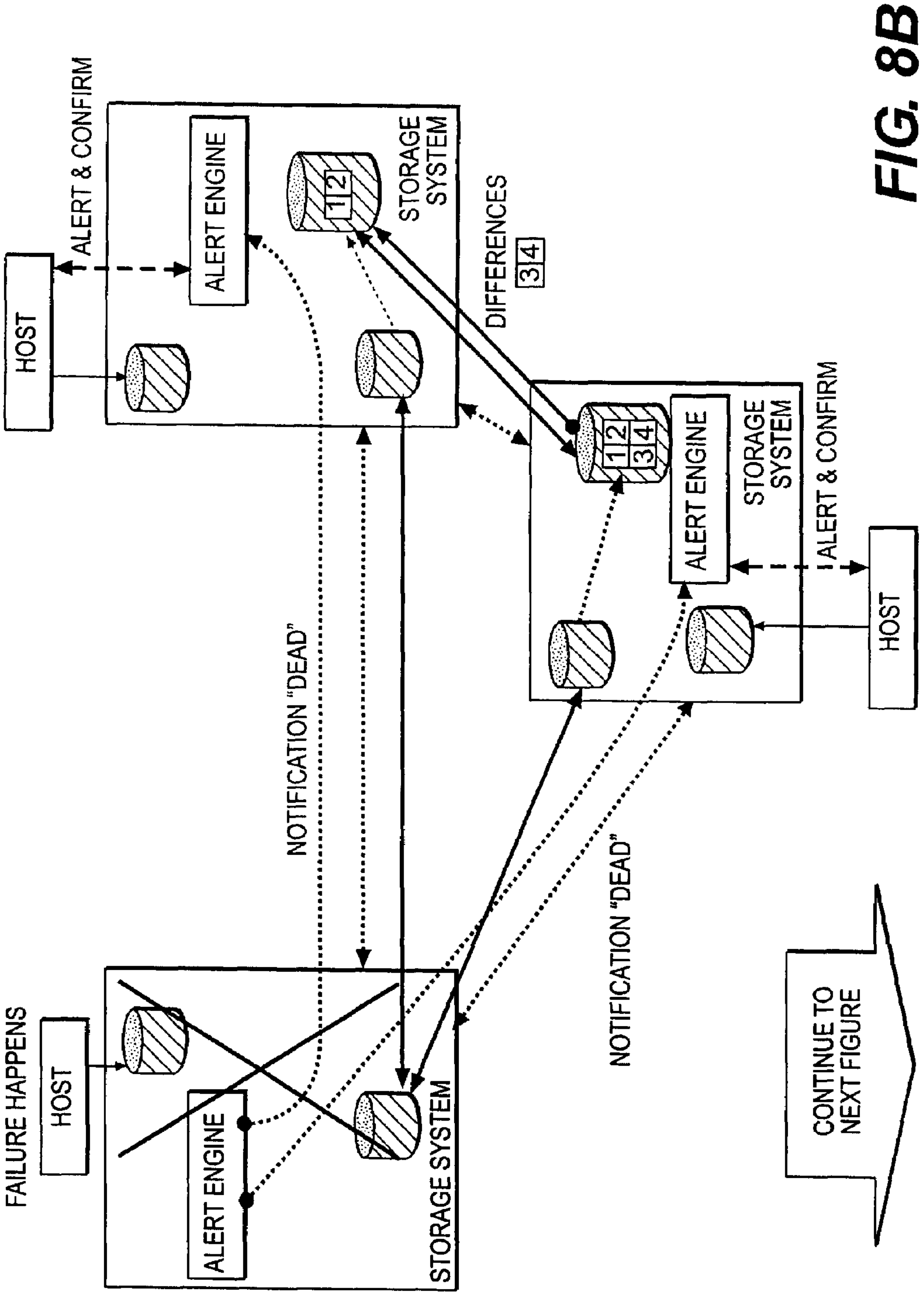
FIG. 8B illustrates yet another usage example for the monitor activity step B, according to another embodiment of the present invention.
Figure 8C:
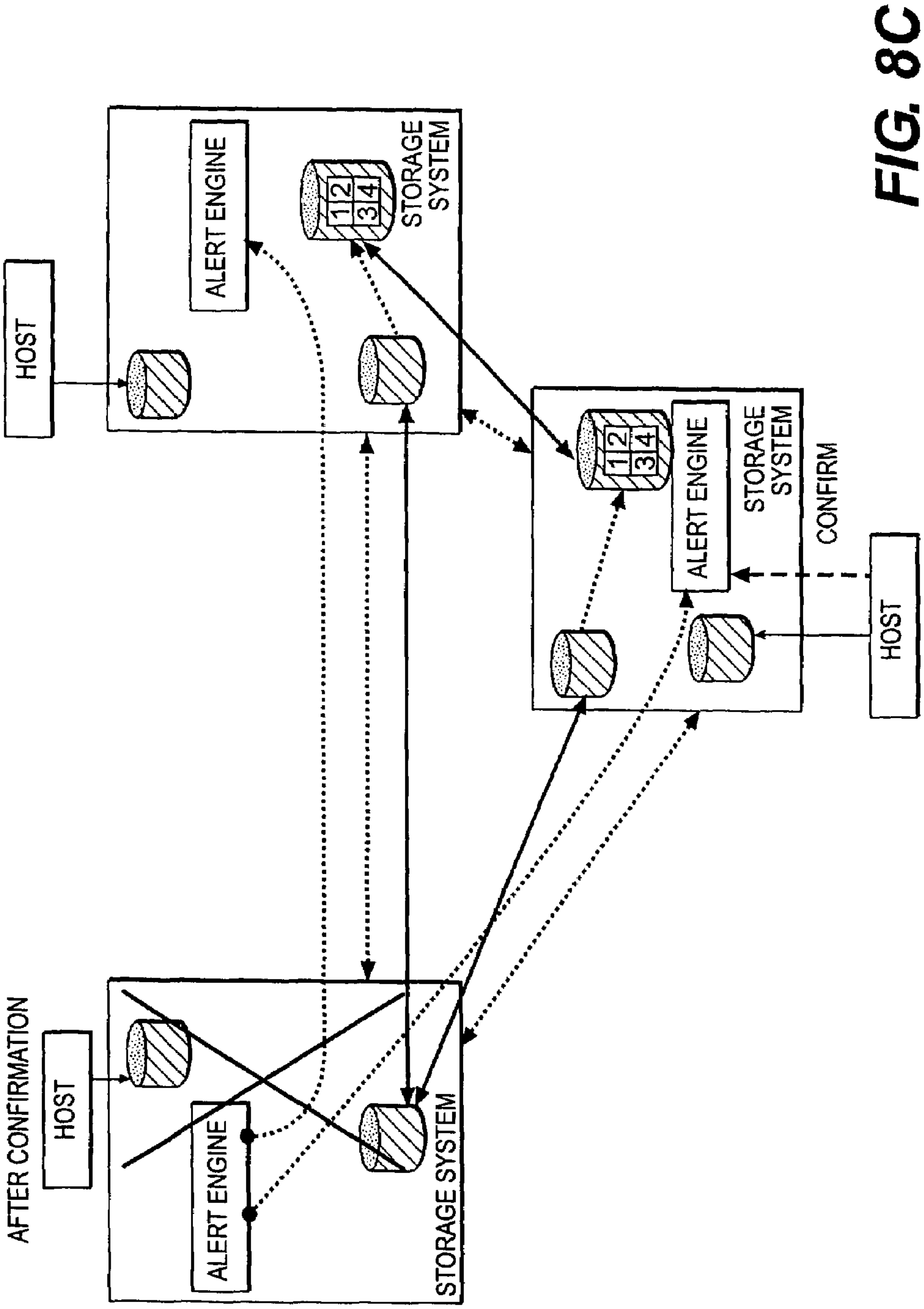
FIG. 8C illustrates yet another usage example for the monitor activity step C, according to another embodiment of the present invention.

FIGS. 8A-8C show an example of a failover process in connection with a multi-site configuration. Usage of the activity monitor and failover process in a multi-site configuration would allow the primary storage system the option of selecting the alternative storage system to which the service originally provided by the primary storage system would be transferred after completion of the failover process.

As shown, if the primary host group fails to continue running the application, then an alert will be sent to the storage systems of the secondary and tertiary host groups. At that time, in one implementation or configuration of the failover process, both systems receiving the alert would start the faster failover process. In this regard, each of the secondary and tertiary storage systems maintains a PiT volume image that is intended to store data identical to that of the other storage system. If the PiT volume images on both storage systems are not identical, the two storage systems will send the differences in data between the two volumes to the other so as to update the data of each volume and thereby make the two volumes identical.

Figure 9A:
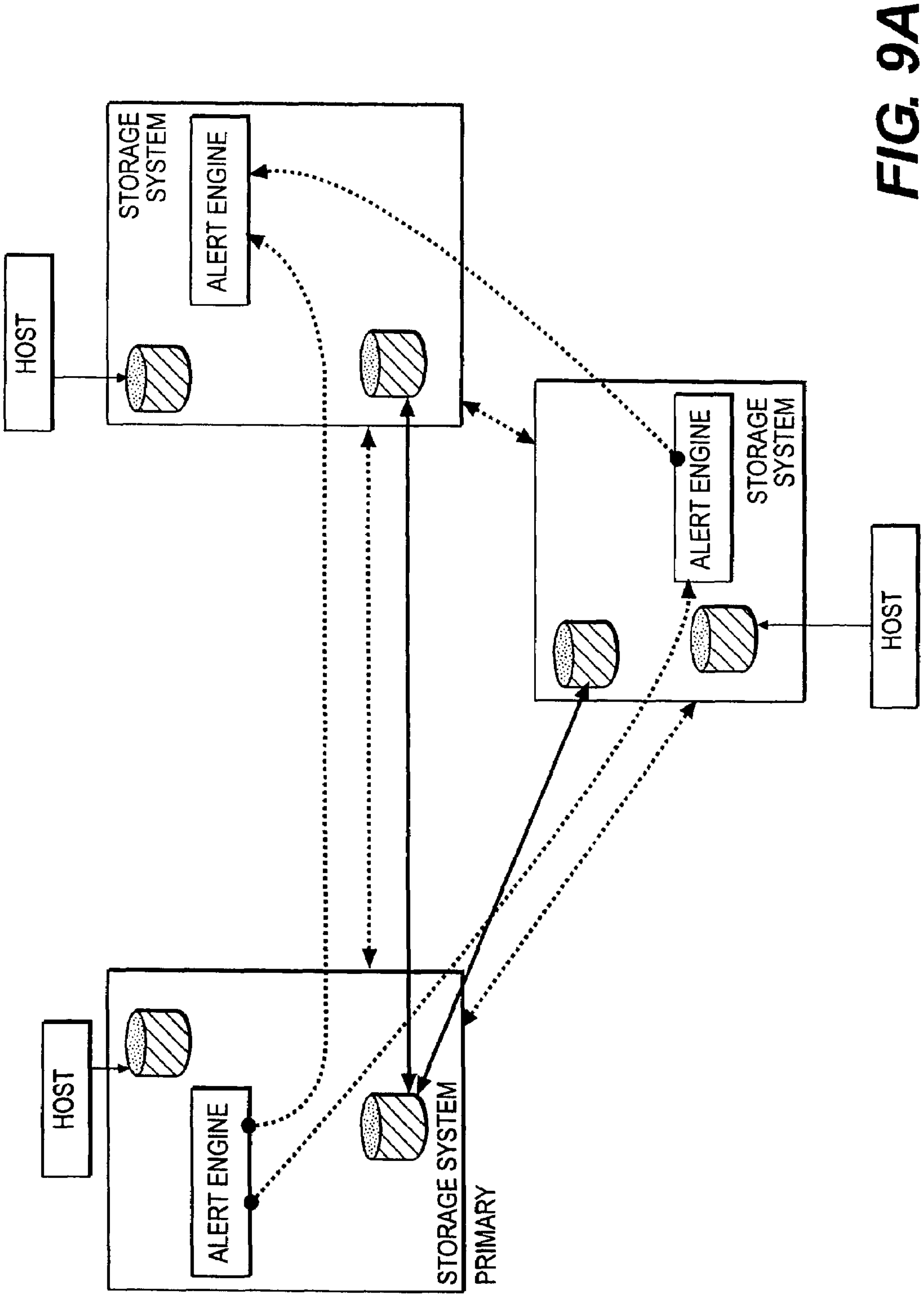
FIG. 9A illustrates yet another usage example of an embodiment of the present invention wherein the remote link failure occurs between the primary and secondary sites.
Figure 9B:
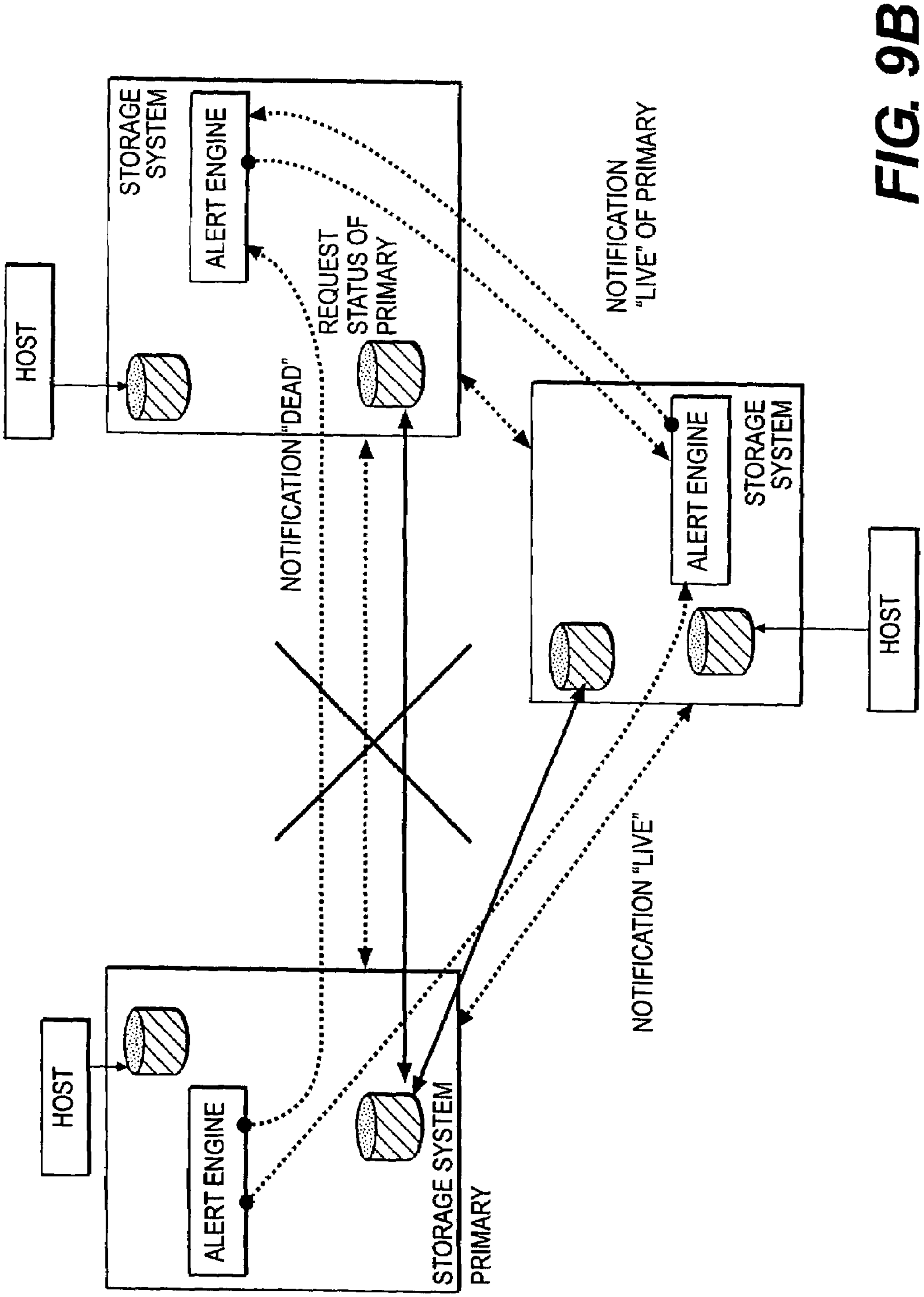
FIG. 9B illustrates yet another usage example of an embodiment of the present invention wherein the remote link failure occurs between the primary and secondary sites.

FIGS. 9A and 9B show an example of remote link failure between the primary and secondary sites or storage systems. In this example of failure, the secondary site cannot determine whether the primary site is dead but also is either not configured to perform the failover process as if it were in a basic two-site configuration, or it cannot make a determination as to whether to initiate failover based on just data from the failed primary site. One way of resolving this type of failure would be to configure the secondary site to receive primary site information from the tertiary storage system or site, assuming the tertiary site can still communicate with the primary site. The alert function operating in the storage system of the tertiary site can provide the status of primary to secondary storage system activity. To access that status information, the secondary site would have to communicate such a request to the tertiary site.

FIGS. 10-15 and the following descriptions are examples for the general process implementations for the various operations and functions performed in connection with the various embodiments of the invention as described above.

Figure 10:
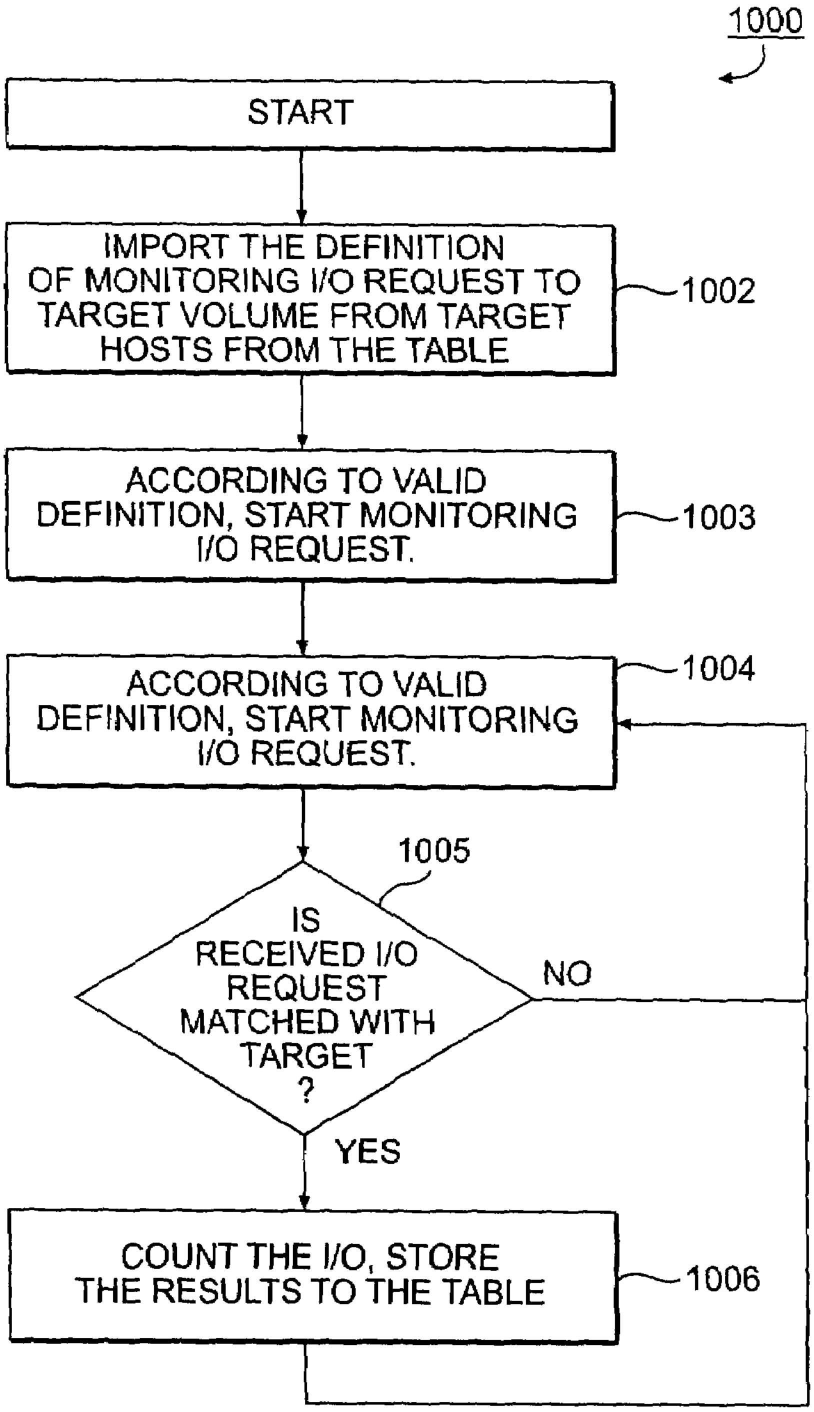
FIG. 10 is a flowchart illustrating a method for importing the definition of monitoring I/O request to the target volume from target hosts from the table.

FIG. 10 is a flowchart illustrating a process 1000 for importing the definition of monitoring I/O request to the target volume from target hosts from the I/O activity or configuration table. In an exemplary embodiment of the invention, the process 1000 is performed in the environment illustrated in FIG. 1F. First, at step 1002, the definition of monitoring I/O requests to target volume from the table of target hosts is imported. At step 1003, if the definition for monitoring the I/O request is valid, according to a predetermined valid definition, the I/O requests are then monitored. At steps 1004-1005, a determination is made whether the received I/O request matches the target. If yes, the I/O request is counted and the results are stored in the I/O activity table, at step 1006. If the received I/O request does not match the target, the definition with respect to at least the rejected I/O request is reviewed with the predetermined valid definition at step 1004 and the cycle restarts with steps 1004-1005.

Figure 11:
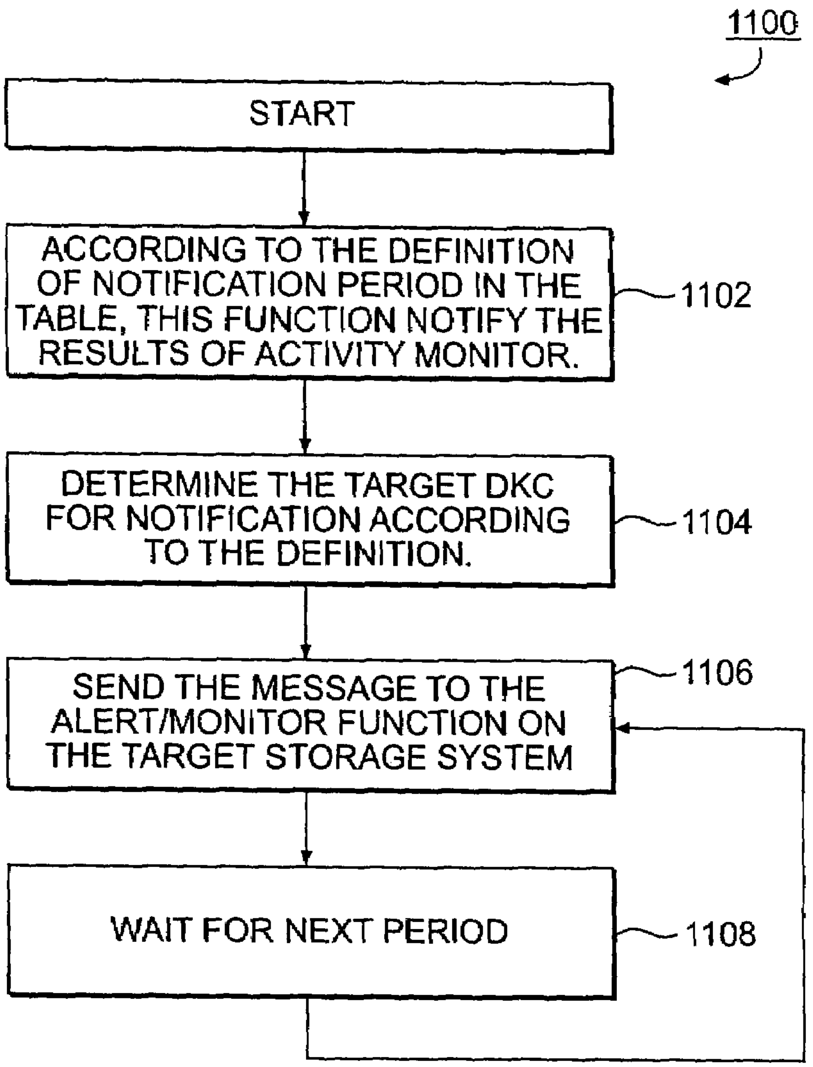
FIG. 11 is a flow-chart illustrating a method of communicating the results of the activity monitoring to the alert/monitor components of the target storage system.

FIG. 11 is a flow-chart illustrating a process 1100 for communicating the results of the activity monitoring to the alert monitoring function or engine of a target storage system. First, at step 1102, according to the definition of notification period stored in the status manage table, the notification function generates notification data about the results of activity monitoring. Next, at step 1104, the target DKC for notification according to the notification period definition is determined. Further, at step 1106, a message to the alert monitoring function or engine on the target storage system is sent, according to the current period. At step 1108, after a predetermined waiting period, the cycle repeats and goes back to step 1106 to send message.

Figure 12:
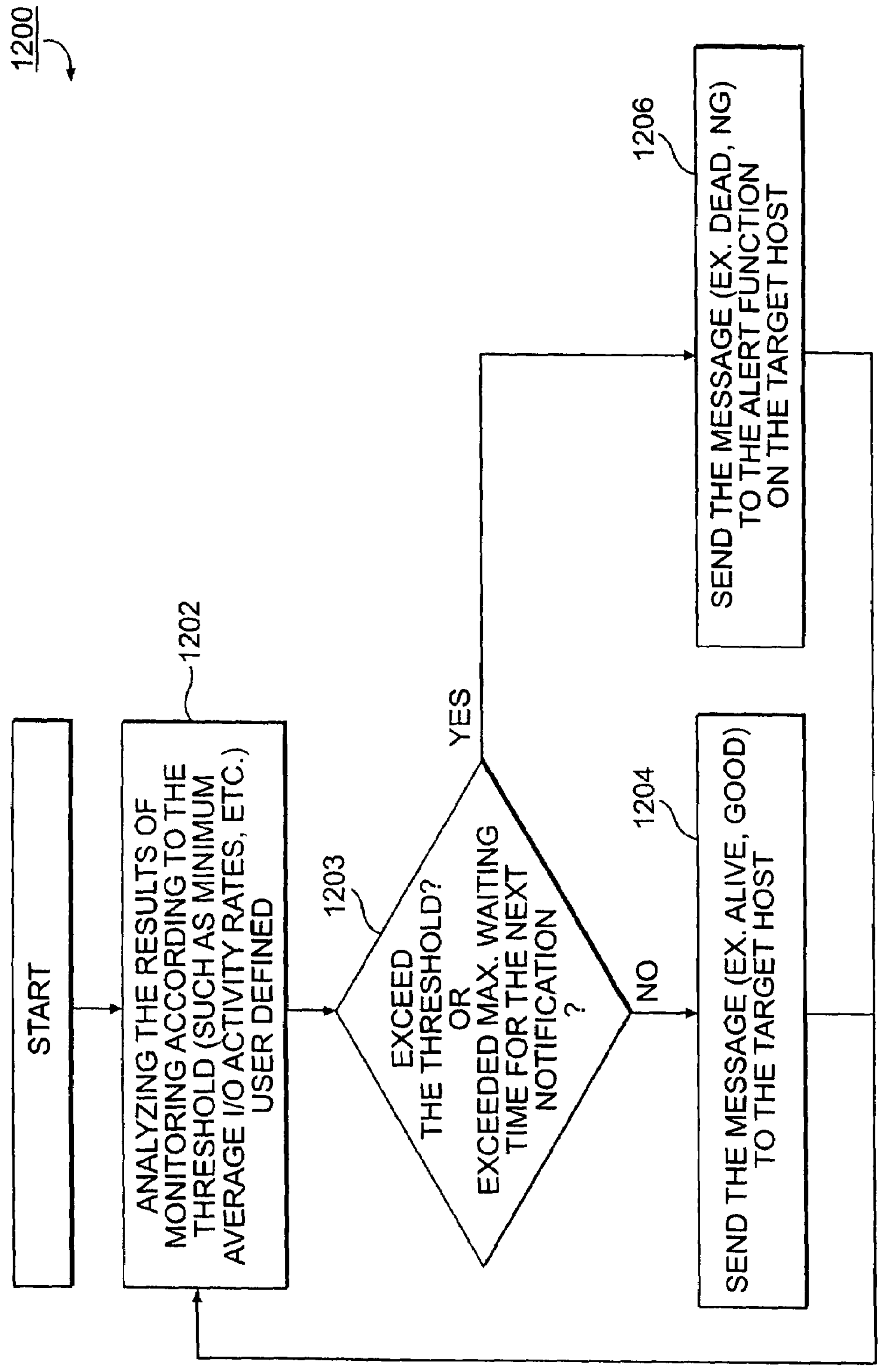
FIG. 12 is a flow-chart illustrating a method of sending the message to the target host.

FIG. 12 is a flow-chart illustrating a process 1200 of sending the message to the target host. First, at step 1202, the results of monitoring according to predetermined user-defined threshold parameters are analyzed. Examples of such threshold parameters include the minimum average I/O activity rates. At step 1203, a determination is made whether the results of monitoring exceed any predetermined thresholds or exceed the maximum waiting time for the next notification. If both determinations are NO, at step 1204, a message such as “ALIVE”, “GOOD”, etc. is sent to the target host. Otherwise, if either determination is YES, at step 1206, an alternative message such as “DEAD”, “NG”, etc. is sent.

Figure 13:
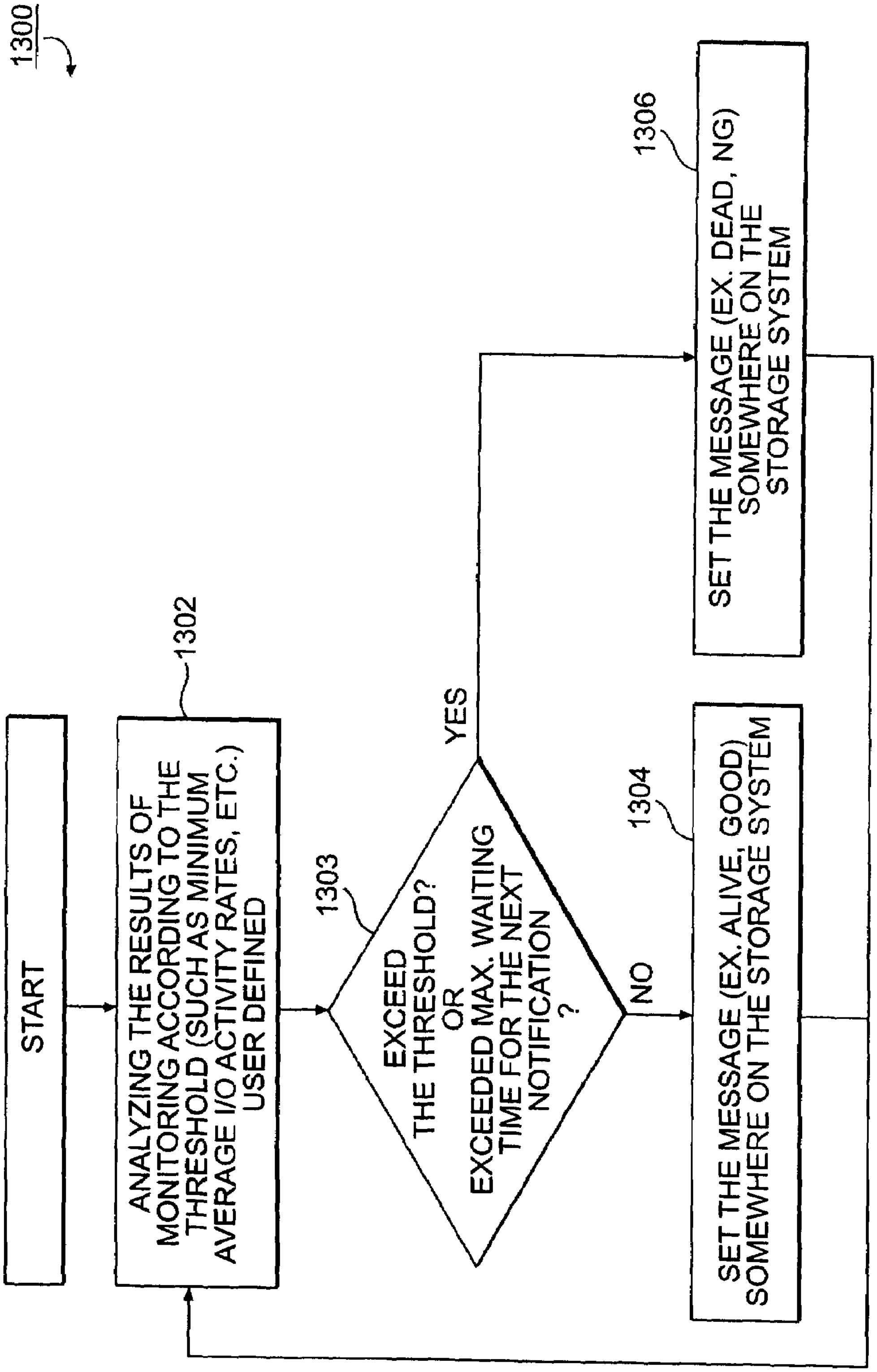
FIG. 13 is a flow-chart illustrating a method of setting a message on the storage system.

FIG. 13 is a flow-chart illustrating a process 1300 of setting a message on the storage system. First, at step 1302, as done at or in conjunction with step 1202 in the above-discussed process 1200, the results of monitoring according to the predetermined user-defined threshold parameters are analyzed. As before, at step 1303, a determination is made whether the results of monitoring exceed any predetermined thresholds or exceed the maximum waiting time for the next notification. If both determinations are NO, at step 1304, a message such as “ALIVE”, “GOOD”, etc. is sent to the target host. Otherwise, if either determination is YES, at step 1306, an alternative message such as “DEAD”, “NG”, etc. is sent.

Figure 14:
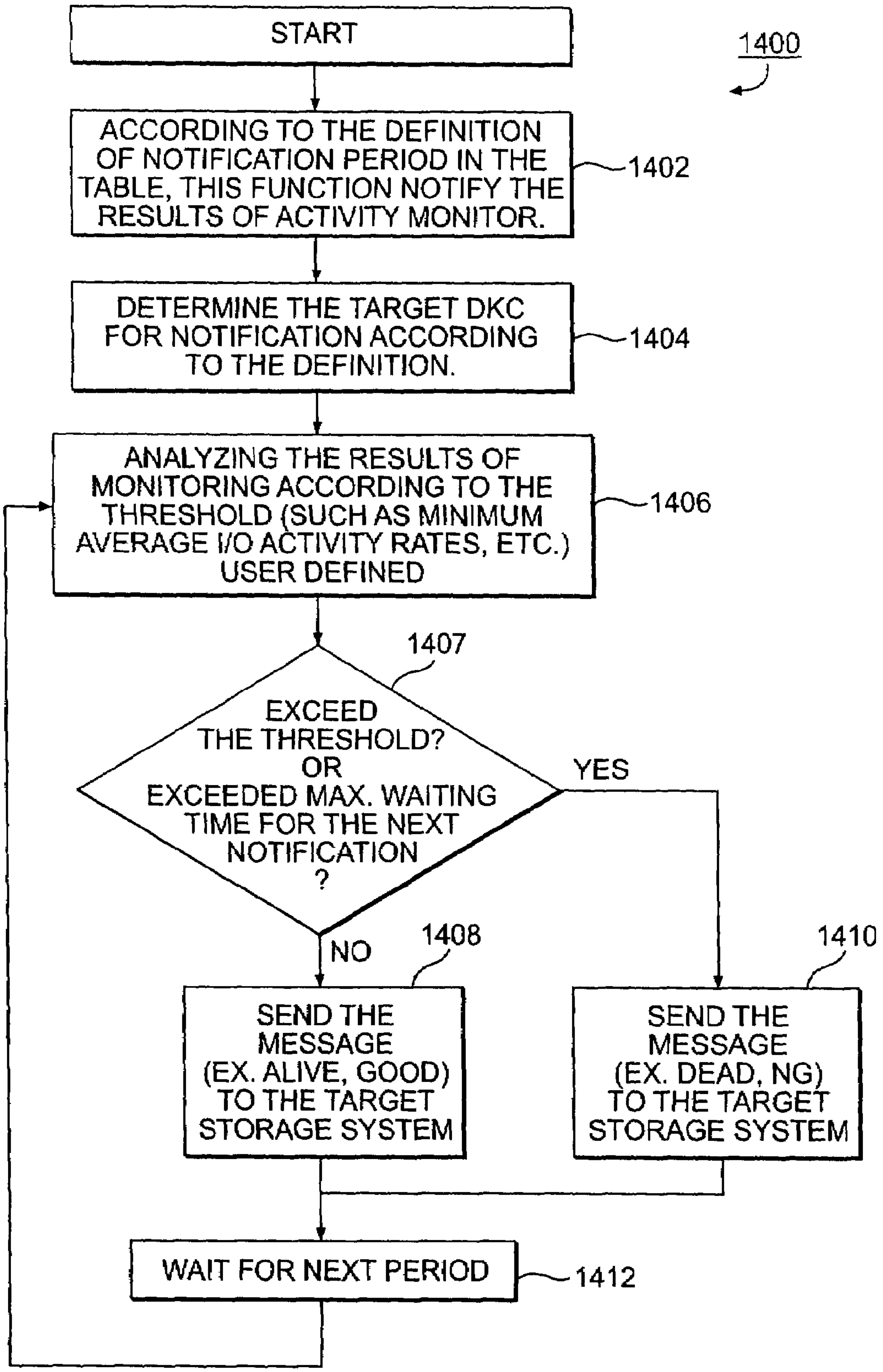
FIG. 14 is a flow-chart illustrating a method of notifying the results of activity monitoring.

FIG. 14 is a flow-chart illustrating a process 1400 of notifying the results of activity monitoring. First, at step 1402, as done in or in conjunction with the process 1100, according to the definition of notification period stored in the I/O activity table, the notification function generates notification data about the results of activity monitoring. Next, at step 1404, the target DKC for notification according to the notification period definition is determined. Further, at step 1406, which is as done in or in conjunction with the process 1200, the results of monitoring according to predetermined user-defined threshold parameters, such as the minimum average I/O activity rates, are analyzed. At step 1407, a determination is made whether the results of monitoring exceed any predetermined thresholds or exceed the maximum waiting time for the next notification. If both determinations are NO, at step 1408, a message such as “ALIVE”, “GOOD”, etc. is sent to the target host. Otherwise, if either determination is YES, at step 1410, an alternative message such as “DEAD”, “NG”, etc. is sent. At step 1412, after a predetermined waiting period, the cycle repeats and goes back to step 1406 to analyze the results of monitoring according to the predetermined user-defined threshold parameters.

Figure 15:
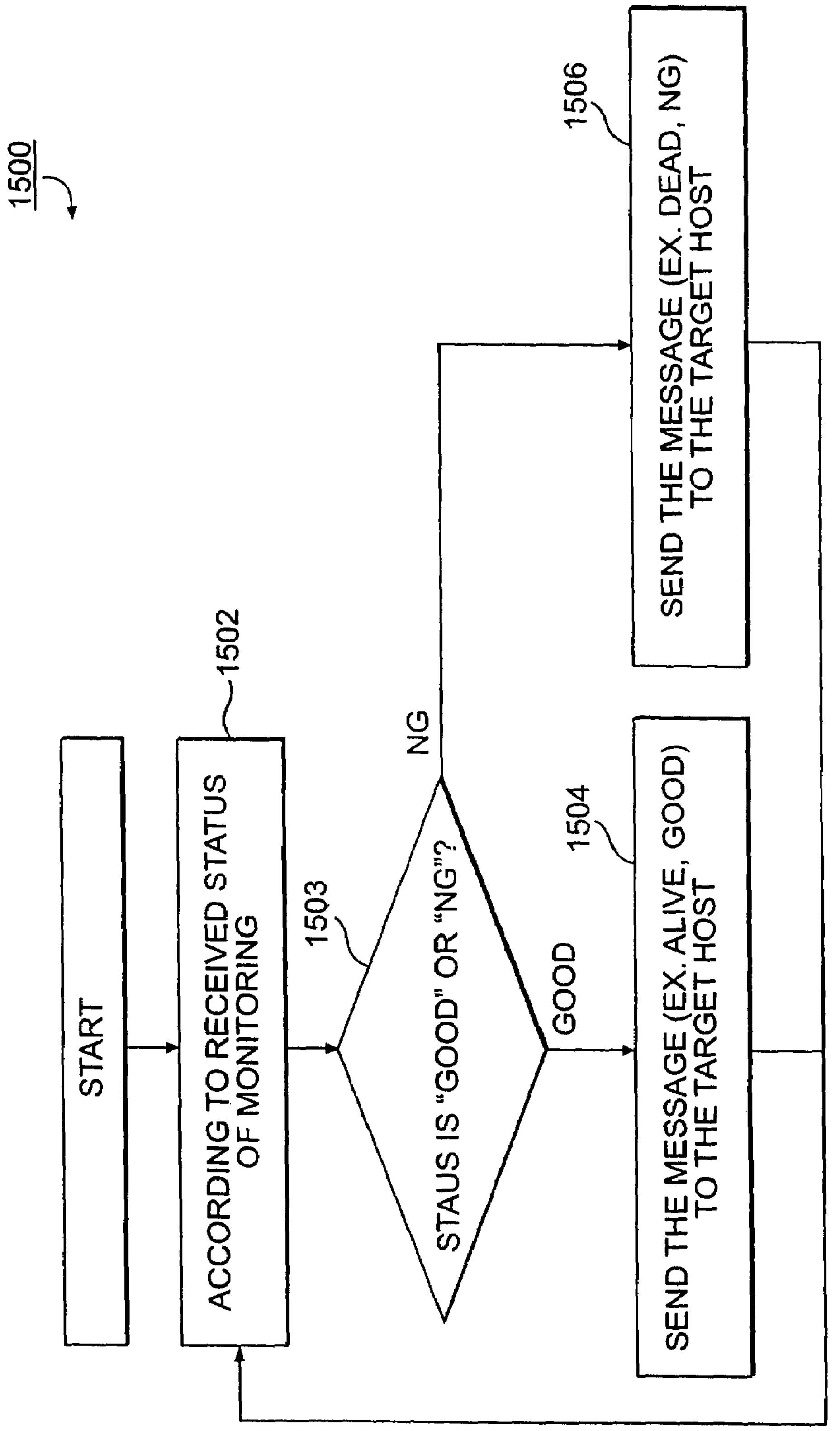
FIG. 15 is a flowchart illustrating a method of directing a message to the target host depending to the received status of monitoring.

FIG. 15 is a flowchart illustrating a process 1500 of directing a message to the target host depending on the received status identifier message regarding the status of monitoring. First, at step 1502, a selection is made in response to the received status identifier message. At step 1503, a determination is made whether the received status identifier message indicates “GOOD” or “NG”. If the status identifier message indicates “NG”, a message is sent to the target host, at step 1506, indicating either “DEAD” or “NG”. If the status identifier message received is “GOOD”, a message of “ALIVE” or “GOOD” is sent to the target host at step 1504. After the message to the target host is received in either event, for the next cycle, the selection is again made at step 1502.

Figure 16:
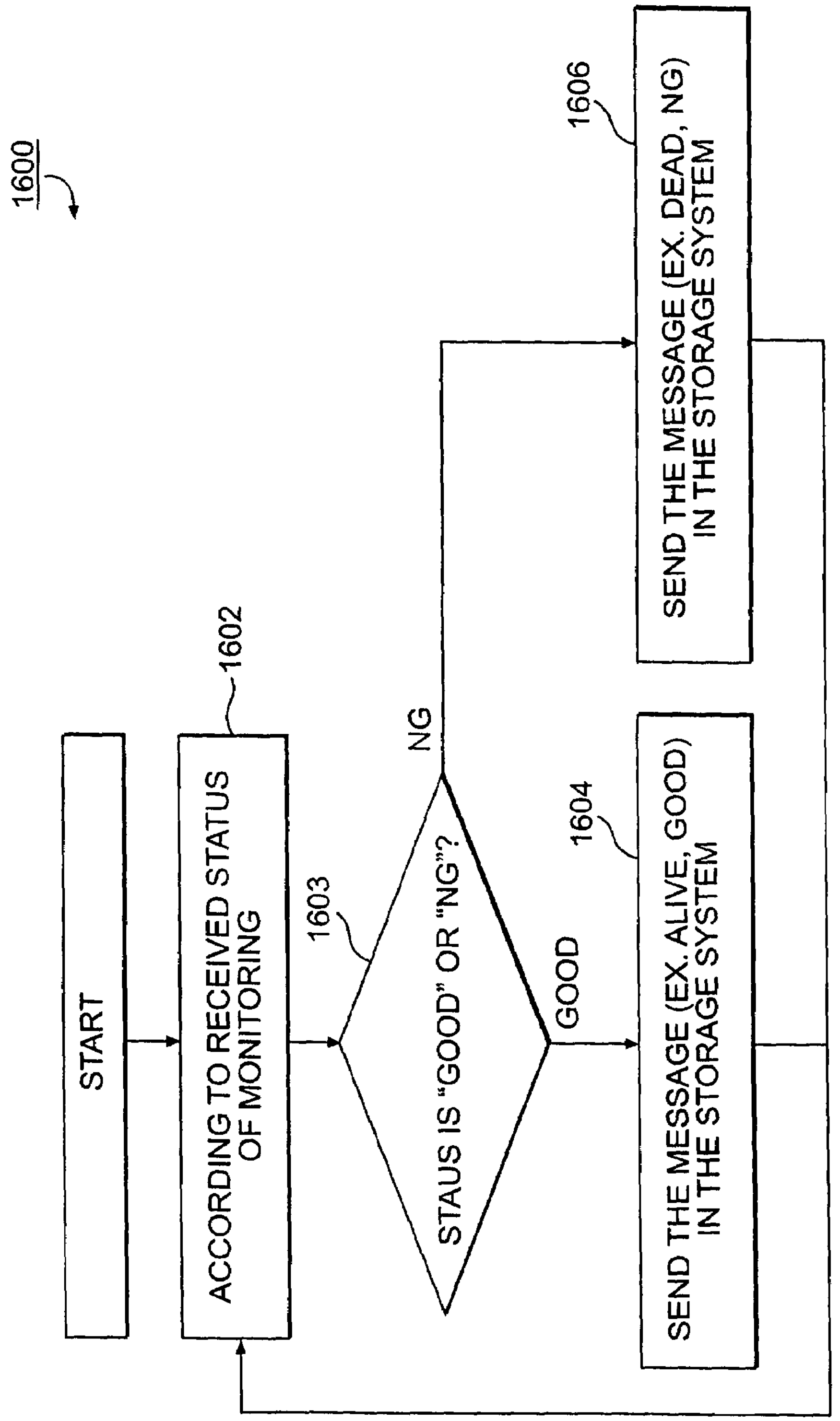
FIG. 16 is a flowchart illustrating a method of directing a message to the storage system depending to the received status of monitoring.

FIG. 16 is a flowchart illustrating a process 1600 of directing a message to the storage system depending on the received status identifier message regarding the status of monitoring. First, at step 1602, as done in or in conjunction with step 1502 of the process 1500 a selection is made in response to the received status identifier message. At step 1603, a determination is made whether the received status identifier message indicates “GOOD” or “NG”. If the status identifier message indicates “NG”, a message is sent to the target host, at step 1606, indicating either “DEAD” or “NG”. If the status identifier message received is “GOOD”, a message of “ALIVE” or “GOOD” is sent to the target host at step 1604. After the message to the target host is received in either event, for the next cycle, the selection is again made at step 1602.

It is to be understood that the above description is intended to be illustrative, and not restrictive. Many other embodiments will be apparent to those skilled in the art upon reviewing the above description. The scope of the invention should be determined with reference to the appended claims, along with the full scope of equivalents to which such claims are entitled.

What is claimed is:

1. A data processing system comprising:

a first storage system associated with a first host; and a second storage system associated with a second host, wherein the first storage system and the second storage system are coupled with each other by a remote copy link so that the second storage system receives a copied data from the first storage system via the remote link, wherein the first storage system monitors a rate of I/O requests received from the first host and communicates with the second storage system via the remote copy link based on the rate of I/O requests so that the second storage host can recognize a status of the first host through the second storage system.

2. The processing system of claim 1, wherein the first storage system monitors I/O requests from the first host to an identified volume thereof.

3. The processing system of claim 1, wherein the rate of I/O requests from the first host to the first storage system is an I/O frequency, a Write/Read Input/Output Per Second (IOPS), or a port usage.

4. The processing system of claim 3, wherein the status of the first host is determined as dead if the rate of I/O requests is less than a first threshold.

5. The processing system of claim 1, further comprising a third storage system coupled with the first storage system via another remote copy link, wherein the first storage system communicates with the third storage system via said another remote copy link based on the rate of I/O requests.

6. A data processing system comprising:

a first storage system associated with a first host;

a second storage system associated with a second host; and a third storage system, wherein the first storage system and the third storage system are coupled with each other by a remote copy link so that the third storage system receives a copied data from the first storage system via the remote link, wherein the second storage system and the third storage system are coupled with each other by another remote copy link so that the second storage system receives a copied data from the third storage system via the another remote link, and wherein the first storage system monitors a rate of U/O requests received from the first host and communicates with the second storage system via the remote copy link and the another remote copy link through the third storage system, based on the rate of I/O so that the second host can recognize a status of the first host.

7. The processing system of claim 6, wherein the third storage system relays information used to determine the status of the first host to the second storage system.

8. A data processing method implemented by a data processing system including a first storage system associated with a first host and a second storage system associated with a second host, the first storage system and the second storage system being coupled with each other by a remote copy link, comprising:

transmitting a copied data from the first storage system to the second storage system via the remote link, monitoring by the first storage system a rate of I/O requests received from the first host; and communicating by the first storage system with the second storage system via the remote copy link based on the rate of I/O requests thereby recognizing by the second storage host through the second storage system a status of the first host through the second storage system.

9. The processing method of claim 8, wherein the first storage system monitors I/O requests from the first host to an identified volume thereof.

10. The processing method of claim 8, wherein the rate of I/O requests from the first host to the first storage system is an I/O frequency, a Write/Read Input/Output Per Second (IOPS), or a port usage.

11. The processing method of claim 10, wherein the status of the first host is determined as dead if the rate of I/O requests is less than a first threshold.

12. The processing method of claim 1, wherein the data processing system further includes a third storage system coupled with the first storage system via another remote copy link, and the method further comprising communicating by the first storage system with the third storage system via said another remote copy link based on the rate of I/O requests.

13. A data processing method implemented by a data processing system including a first storage system associated with a first host, a second storage system associated with a second host, and a third storage system, the first storage system and the third storage system being coupled with each other by a remote copy link and the second storage system and the third storage system being coupled with each other by another remote copy link, comprising:

transmitting a copied data from the first storage system to the third storage system via the remote link;

transmitting a copied data from the second storage system to the third storage system via the another remote link;

monitoring by the first storage system a rate of I/O requests received from the first host; and communicates by the first storage system with the second storage system via the remote copy link and the another remote copy link through the third storage system, based on the rate of I/O, thereby recognizing by the second host a status of the first host.

14. The processing system of claim 13, further comprising relaying by the third storage system to the second storage system information used to determine the status of the first host.

* * * * *